(12) United States Patent
Wach

(10) Patent No.: US 8,873,966 B1
(45) Date of Patent: Oct. 28, 2014

(54) COMPACT TRANSCEIVER SYSTEM AND METHOD FOR OPTICAL COMMUNICATION

(75) Inventor: Michael L. Wach, Alpharetta, GA (US)

(73) Assignee: Cirrex Systems, LLC, Wilmington, DE (US)

( * ) Notice: Subject to any disclaimer, the term of this patent is extended or adjusted under 35 U.S.C. 154(b) by 827 days.

(21) Appl. No.: 12/380,826

(22) Filed: Feb. 25, 2009

Related U.S. Application Data

(60) Provisional application No. 61/067,154, filed on Feb. 26, 2008.

(51) Int. Cl.
*H04B 10/40* (2013.01)

(52) U.S. Cl.
USPC .......................................... 398/138

(58) Field of Classification Search
USPC .......................................... 398/138
See application file for complete search history.

(56) References Cited

U.S. PATENT DOCUMENTS

| 5,305,133 | A | * | 4/1994 | Cooper et al. ............... 398/42 |
| 5,914,976 | A | * | 6/1999 | Jayaraman et al. ......... 372/50.21 |
| 6,028,462 | A | | 2/2000 | Kyles |
| 6,545,567 | B1 | | 4/2003 | Pavan et al. |
| 7,158,567 | B2 | | 1/2007 | Wang et al. |
| 2001/0004188 | A1 | * | 6/2001 | Jacobsen et al. ............... 313/461 |

\* cited by examiner

*Primary Examiner* — Nathan Curs
(74) *Attorney, Agent, or Firm* — Ascenda Law Group, PC

(57) ABSTRACT

An optical communication device, such as a transceiver, can send outgoing information over an optical link and receive incoming information via the link. The link, for example an optical fiber, can simultaneously transmit outgoing light carrying outgoing information and incoming light carrying incoming information. The communication device can comprise a detector outputting electrical signals in response to receiving optical signals, effectively converting signals from the optical domain to the electrical domain. The detector can receive a mixture of the incoming and the outgoing light, thereby producing an electrical signal containing imprints of both the incoming data and the outgoing data. The communication device can process the electrical signal to differentiate between the incoming data and the outgoing data. Knowing the outgoing data, the optical communication device can subtract from the electrical signal the portion of the signal associated with the outgoing light, thereby revealing the incoming data.

4 Claims, 11 Drawing Sheets

Fig. 4A — Transmission of Rear Facet 312 (Laser 111)
Fig. 4B — Transmission of Front Facet 311 (Laser 111)
Fig. 4C — Transmission of Front Facet 321 (Laser 121)
Fig. 4D — Transmission of Rear Facet 322 (Laser 121)

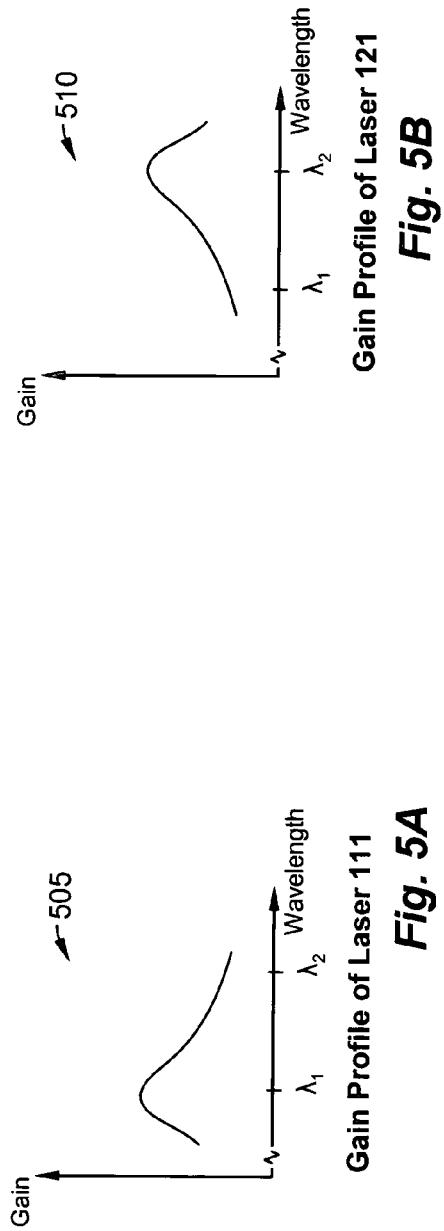
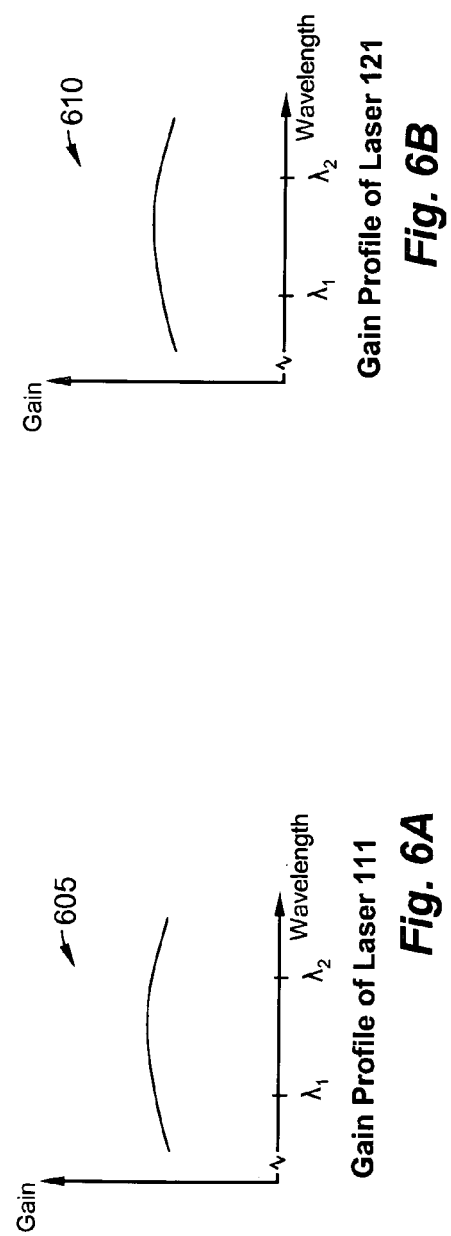
Fig. 5A — Gain Profile of Laser 111
Fig. 5B — Gain Profile of Laser 121
Fig. 6A — Gain Profile of Laser 111
Fig. 6B — Gain Profile of Laser 121

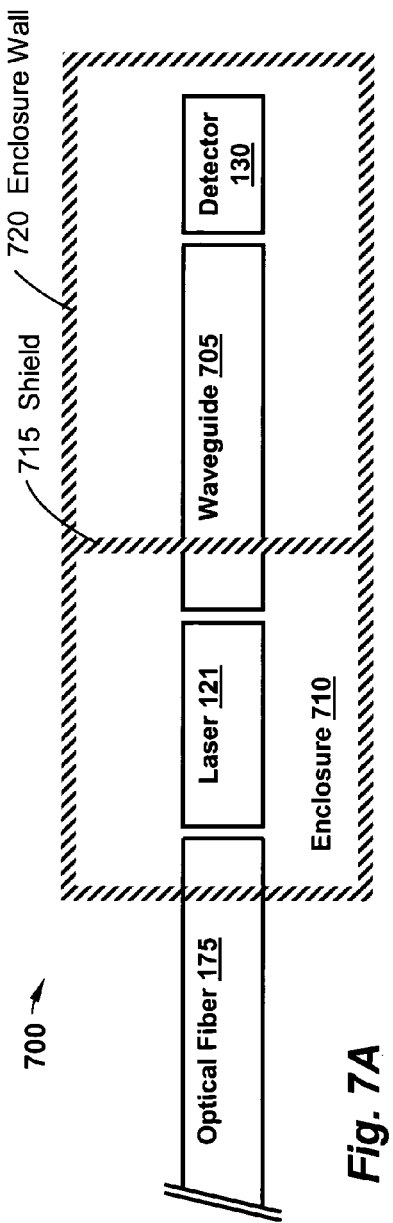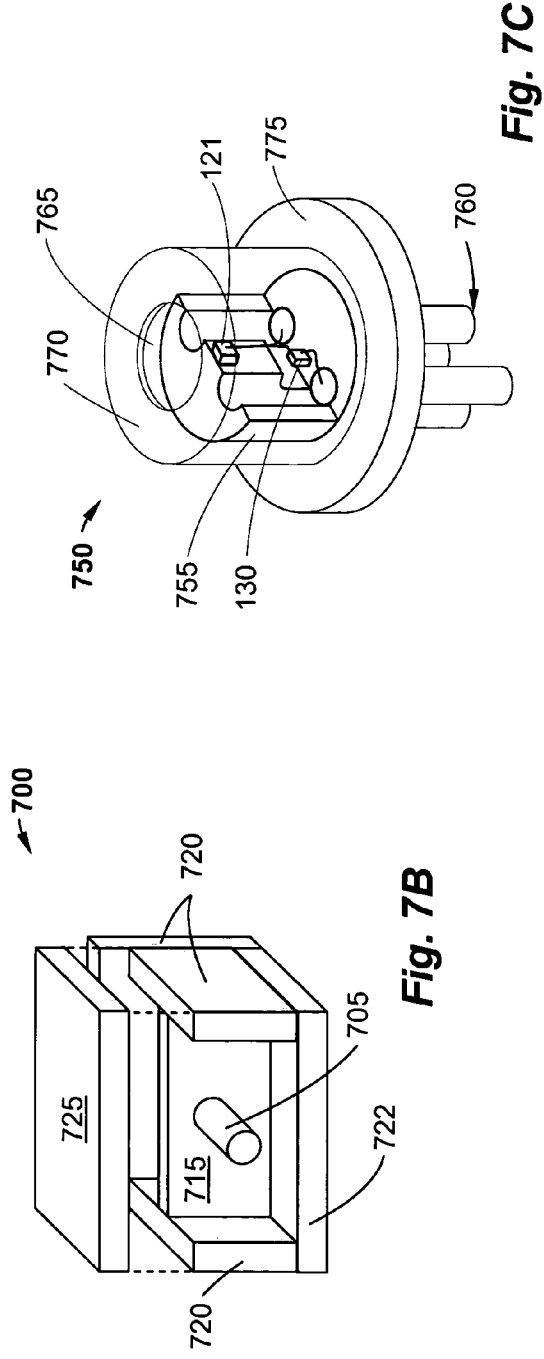
Fig. 7A
Fig. 7B
Fig. 7C

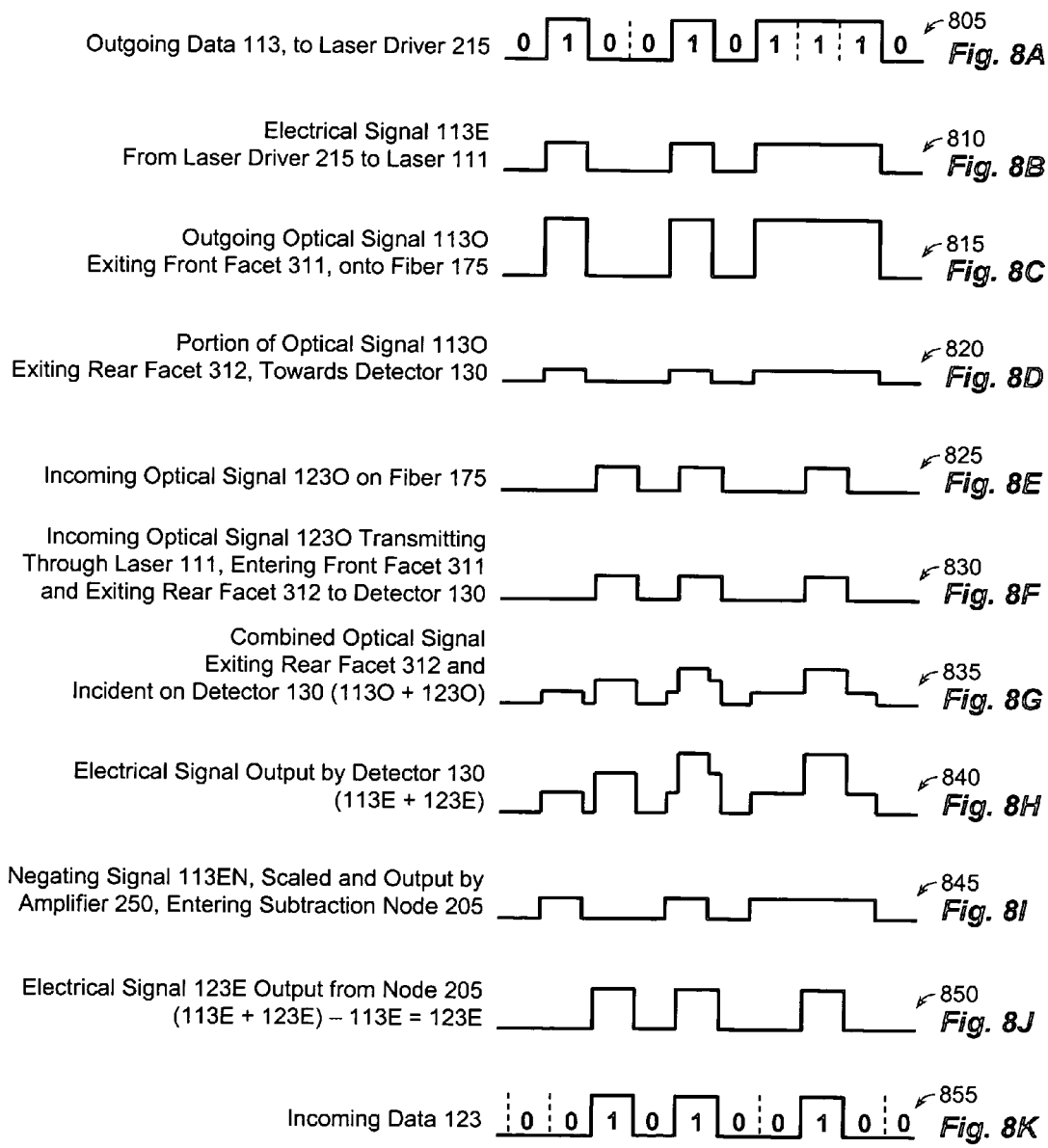

COMPACT TRANSCEIVER SYSTEM AND METHOD FOR OPTICAL COMMUNICATION

CROSS REFERENCE TO RELATED APPLICATIONS

This application claims priority to U.S. Provisional Patent Application No. 61/067,154, filed Feb. 26, 2008 in the name of Wach and entitled "Compact Transceiver System and Method for Optical Communication," the entire contents of which are hereby incorporated herein by reference.

FIELD OF THE TECHNOLOGY

The present invention generally relates to optical communications involving a transceiver that comprises a laser for transmitting outgoing optical signals and a detector for receiving incoming optical signals, and more particularly to passing the incoming optical signals through the laser to the detector. The detector may receive a portion of the outgoing optical signals along with the incoming optical signals, thereby outputting electrical signals having contributions from known outgoing data and from unknown incoming data. Processing the electrical signals based on the known outgoing data can reveal the incoming data.

BACKGROUND

Optical communications involves imprinting or encoding information on light, thereby adapting the light to carry or convey the information as the light propagates or travels between two sites. The two sites may be across the globe or across a country, a state, a town, or a room, for example.

Imprinting or encoding information on the light typically involves modulating or changing some attribute or aspect of the light over time to create a pattern representing the information. A sender or transmitter of the information imposes the pattern on the light, and a receiver of the information identifies the pattern and thereby recovers the information.

For example, sailors on two distant ships may communicate with one another with powerful flashlights. One sailor pulses light on and off in a sequential pattern that represents letters of the alphabet, forming words and sentences, for example in Morse code. The other, distant sailor watches the light and notes the on-off pattern. Knowing the on-off sequences of each letter, that distant observer sailor determines the letters, words, and sentences via reversing the code. While modern fiber optic communication systems are more sophisticated than sailors sending messages to one another with flashlights, the basic concept is generally analogous.

A fiber optic communication system may comprise terminals or users linked together via optical paths, for example in a fiber optic network. Each terminal may comprise a transmitter and a receiver that may be components of a transceiver. Each terminal's transmitter typically outputs light imprinted or encoded with information destined for receipt at another, remote terminal. Meanwhile, each terminal's receiver typically receives light that has been imprinted or encoded with information at another, remote terminal. Accordingly, devices on an optical network can communication with one another via sending and receiving optical signals.

In one type of conventional approach, the outgoing light has one color or wavelength, and the incoming light has another color or wavelength. Thus, the transmitter includes a laser outputting optical signals of one color, which could be termed the "output color." The transmitter may also include a monitor detector receiving a small sample of the outgoing optical signals to facilitate power control. That is, the laser may have an associated monitor detector for monitoring and controlling laser power or performance. When situated opposite a rear facet of a semiconductor laser, such a monitor detector can be termed a "rear facet monitor." Meanwhile, the terminal's receiver includes a different detector receiving optical signals of another color, which could be termed the "input color." The receiver detector is distinct and separate from the monitor detector, and the input color and the output color are distinct.

A system of one or more optical filters manipulates the incoming light and the outgoing light according to color. A typical optical filter implementation passes or transmits one color while reflecting another color, for example transmitting the output color and reflecting the input color. Such a filter can be positioned in the path of the light output by the laser, with the filter tilted at an angle to that path. In this configuration, the output laser light passes through the filter and onto the fiber optic network. The filter reflects the incoming light. By virtue of the filter being oriented at an angle relative to the light path of the output laser light, the reflected incoming light diverts to the detector of the receiver for receipt. In other words, the filter transmits the output light to the fiber optic network and diverts the incoming light (from the fiber optic network) to the receiver detector. Any incoming photons that might transmit through the filter and into the laser as stray light are generally inadvertent and unwanted. Accordingly, signal separation occurs in the optical domain.

One issue with the conventional transceiver technology described above concerns the optical filter. With many conventional optical filter technologies, filters can be more expensive than applications with tight cost constraints can tolerate. Moreover, conventional filtering systems often comprise lens systems for manipulating the filtered light. Such lens systems can be too expensive for cost-sensitive applications, such as fiber-to-the-home ("FTTH"), local area networks ("LANs"), optical buses within computing systems, backplane interconnects, core-to-core networks of microprocessors, etc., for which optical communications would be desirable at appropriate price points. In addition to expense issues, optical architectures of conventional transceivers often are not conducive to mass production. The constraints of aligning and assembling conventional filters and lenses usually call for special assembly techniques and equipment that are far more costly and less scalable than the technology available for electronic assembly. Finally, most conventional transceivers occupy too much space and consume too much power.

In order to address at least one of the aforementioned representative deficiencies in the art (or some other related shortcoming), various needs are apparent. A first need exists for a transmitter and receiver pair that are compact, for example as an integrated transceiver. A second need exists for a detector system that can differentiate between incoming and outgoing light. A third need exists for circuitry that processes an electrical signal imprinted or encoded both with incoming data and with outgoing data, with the processing revealing the incoming data. A fourth need exists for a laser that can produce outgoing optical signals while passing incoming optical signals for receipt by a detector. A fifth need exists for technology that can discriminate between light encoded with incoming data and light encoded with outgoing data. A sixth need exists for a method of processing optical signals (or corresponding electrical signals) imprinted with known information and unknown information in a manner that identifies the unknown information. A seventh need exists for a transceiver that can be mass produced with low-cost, that is small, and that provides low power consumption. An eighth need exists for a technology that can implement in electronics signal-separation functionality traditionally performed in the optical domain. A ninth need exists for signal processing that can address noise or signal degradation associated with stray light or with mixing optical signals in a transceiver. The foregoing discussion of needs in the art is intended to be representative rather than exhaustive. A technology addressing one or more such needs would benefit optical communications, for example via providing lower cost, better access to higher bandwidth, new applications, reduced size, lower power consumption, etc.

SUMMARY

The present invention supports imposing a series or pattern of intensity variations on an optical signal (or a change in some other characteristic of a stream of light) so that the optical signal carries digital or analog information as it travels. The information can transmit around the globe; across a country, a state, a town, or a room; among core processors of a multi-core microprocessor system; or between two devices in an enclosure, on a backplane, within a computer or router chassis, on a circuit board, or in/on a single substrate, to mention a few possibilities.

In one aspect of the present invention, an optical communication device can communicate with a remote optical communication device (or multiple remote optical communication devices) via sending and receiving optical signals. The optical communication device can send information via emitting outgoing optical signals carrying information intended for receipt at the remote optical communication device. The optical communication device can receive information via receiving incoming optical signals that originated at the remote optical communication device, with the incoming optical signals carrying information intended for receipt at the optical communication device. The optical communication device can comprise a detector for converting optical signals into electrical signals. The detector can receive at least some optical energy from both the incoming optical signals and the outgoing optical signals. Accordingly, the optical communication device's detector can produce an electrical signal imprinted with both incoming information and outgoing information. The optical communication device can process the electrical signal to determine (or to isolate, recover, identify, etc.) the incoming information. Such processing can comprise, for example, producing a second electrical signal imprinted with the outgoing information and then subtracting that second electrical signal from the electrical signal output by the detector.

For example, a transceiver can comprise a laser for transmitting outgoing optical signals and a detector for receiving incoming optical signals. The detector may receive a portion of the outgoing optical signals along with the incoming optical signals, thereby outputting electrical signals having contributions from known outgoing data and from unknown incoming data. Processing the electrical signals based on the known outgoing data can reveal the incoming data.

The discussion of transmitting and receiving optical signals presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

BRIEF DESCRIPTION OF THE DRAWINGS

FIGS. 4A, 4B, 4C, and 4D (collectively FIG. 4) are spectral plots of front and rear facets of two lasers, respectively included in two terminals, of an optical network in accordance with certain exemplary embodiments of the present invention.

FIGS. 5A and 5B (collectively FIG. 5) are gain profile plots of two lasers, respectively included in two terminals, of an optical network in accordance with certain exemplary embodiments of the present invention.

FIGS. 6A and 6B (collectively FIG. 6) are gain profile plots of two lasers, respectively included in two terminals, of an optical network in accordance with certain exemplary embodiments of the present invention.

FIGS. 7A and 7B are illustrations of an enclosure for a laser and a detector of a terminal of an optical network in accordance with certain exemplary embodiments of the present invention.

FIG. 7C is an illustration of a packaged laser and detector of a terminal of an optical network in accordance with certain exemplary embodiments of the present invention.

FIGS. 8A, 8B, 8C, 8D, 8E, 8F, 8G, 8H, 8I, 8J, and 8K (collectively FIG. 8) are plots of signals in a terminal of an optical network in accordance with certain exemplary embodiments of the present invention.

Figure 1:
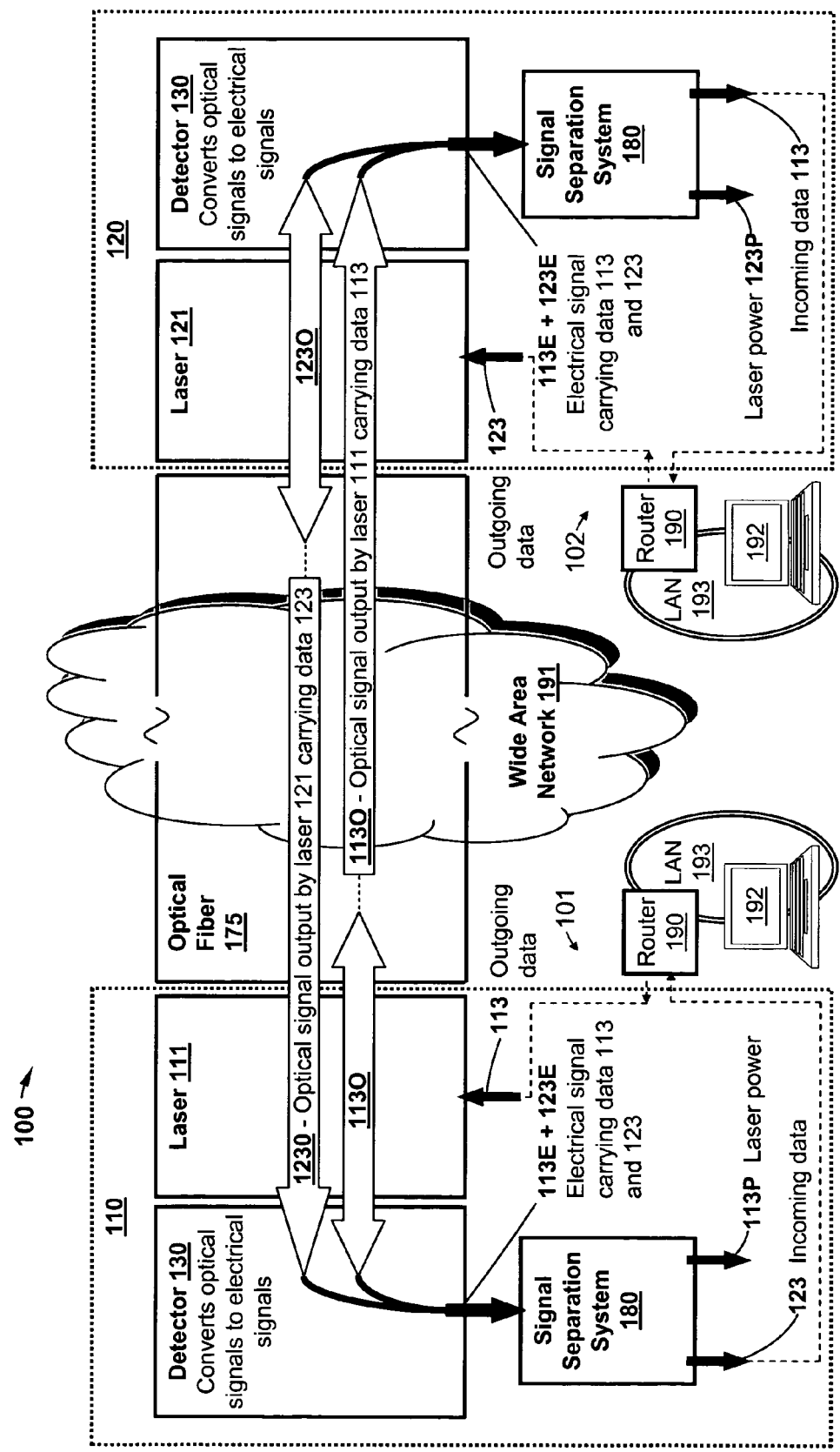
FIG. 1 is a functional block diagram illustration of an optical network in accordance with certain exemplary embodiments of the present invention.

Many aspects of the present invention can be better understood with reference to the above drawings. The elements and features shown in the drawings are not necessarily to scale, emphasis instead being placed upon clearly illustrating principles of exemplary embodiments of the present invention. Moreover, certain dimensions may be exaggerated to help visually convey such principles. In the drawings, reference

DETAILED DESCRIPTION OF EXEMPLARY EMBODIMENTS

An exemplary embodiment of the present invention can support transmitting and receiving information optically with a system that distinguishes between incoming light and outgoing light via signal processing implemented in the electrical domain, thereby supporting multiplexing with relatively simple optics.

An exemplary embodiment of such a system that comprises at least one transceiver for transmitting and receiving optical signal will be described more fully hereinafter with reference to FIGS. 1-10, which depict representative or illustrative embodiments of the present invention.

The term "transceiver," as used herein, generally refers to a system that receives optical communication signals and transmits optical communication signals, each conveying distinct information. Receiving optical communication signals typically comprises converting or transferring information from the optical domain to the electrical domain. Transmitting optical communication signals typically comprises converting or transferring information from the electrical domain to the optical domain. Accordingly, in an exemplary transceiver, optically encoded information may become electrically encoded information, and electrically encoded information may become optically encoded information. The electrical-to-optical and optical-to-electrical conversions can each comprise adding or removing information, for example in connection with data aggregation, adding control bits, applying addressing protocols, etc.

FIG. 1 illustrates a representative optical network that can comprise transceivers. FIGS. 2-6 describe representative transceivers. FIGS. 7 and 8 describe representative signals and methods relating to operating transceivers.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a functional block diagram of an optical network 100 in accordance with certain exemplary embodiments of the present invention. The exemplary optical network 100 comprises a wide area network ("WAN") 191 that may span across a country, a state, or a significant geographic region. Alternatively, the optical network 100 can connect nodes or site within a LAN, a home network, an FTTH network, an access network, or one or more communication links within a local area (not an exhaustive list). Moreover, the optical network 100 can be essentially contained within a single piece of equipment or in a single enclosure. In some exemplary embodiments, the optical network 100 is disposed on or is attached to a single substrate, for example to connect processing cores of a multi-core microprocessor (computing processor) system. Further, in one exemplary embodiment, the optical network 100 can comprise a unitary optical path that links two users together, without supporting additional user connections. As one more example out of many possibilities, the optical network 100 might provide one or more optical interconnects or optical links for a backplane or an optical bus that transmits information within communications or computing equipment. According, a wide variety of communication devices or systems can be substituted for the WAN 191.

The exemplary optical network 100 facilitates two or more sites, nodes, or terminals 101, 102 sending and receiving information, either between one another or in communication with some other site or sites on the optical network 100. The term "terminal," as used herein, generally refers to a site or a location on a network in which information-bearing signals enter and/or leave. Such a site might comprise a node, a transceiver, a transmitter, a receiver, a router, a hub, an add spot, a drop spot, a communication system, a tap, a server, a communication station, a computer, some means for feeding information, or some location where information embarks or disembarks, to name a few examples. A terminal might be in a middle of a communication link, rather than at the absolute end of a line. For example, selected signals can be added to or dropped from a stream of signals, while other signals of the stream proceed essentially uninterrupted.

FIG. 1 illustrates two exemplary transceivers 110, 120 in communication with one another. While various embodiments of the optical network 100 may comprise numerous transceivers, two have been selected for illustration in the interest of clearly describing representative principles of design, operation, and utility.

The optical fiber 175 provides an optical path between the transceiver 110 and the transceiver 120. More generally, one or more optical waveguides or other optical media support optical communication between the two transceivers 110, 120. In an alternative exemplary embodiment, the transceivers 110, 120 communicate with one another via sending and receiving light through free space or open air.

The term "waveguide," as used herein, generally refers to a device or structure that directs, controls, or steers light to flow along a path, course, route, or channel and confines, limits, or binds the light so the light generally says on or in the path, course, route, or channel. An optical waveguide can comprise one or more structures that guide and/or generally confine light during transmission. For example, such an optical waveguide can comprise an elongate or elongated section of optical material that has high refractive index relative to an adjacent material, such as a cladding. In this configuration, the cladding helps keep the light on course. Another type of waveguide can comprise a material with a pattern of structures, such as holes, that help transmitting light maintain a prescribed course of travel without unwanted or excessive divergence or loss.

Each transceiver 110, 120 connects to a respective router 190 that in turn connects to a associated LAN 193. Each transceiver 110, 120 provides a transmitter functionality and a receiver functionality. Accordingly, a computer 192 (or some other user) on one LAN 193 can communicate with a computer 192 (or some other user) on the other LAN 193 via the routers 190, the transceivers 110, 120, and the optical fiber 175. In one exemplary embodiment, one router 190 can comprise one transceiver 110, while the other router 190 comprises the other transceiver 120.

Functioning as a transmitter, the transceiver 110 receives outgoing data 113 from the associated router 190 and modulates the laser 111 based on that data 113. Accordingly, the laser 111 produces light imprinted or encoded with the outgoing data 113, in the form of the optical signal 113O. That is the optical signal 113O carries or conveys the data 113. The laser 111 couples one portion of the optical signal 113O to the optical fiber 175 for transmission to and receipt by the transceiver 120. Meanwhile, the laser 111 emits another portion of the optical signal 113O towards the detector 130, which the transceiver 110 comprises.

Functioning as a receiver, the transceiver 110 receives an incoming optical signal 123O sent by the transceiver 120, which is remote with respect to the transceiver 110. The incoming optical signal 123O is encoded or imprinted with incoming data 123 intended for receipt at the transceiver 110. The optical signal 123O transmits through the laser 111 of the transceiver 110 and is incident on the detector 130 thereof.

Accordingly, the detector 130 of the transceiver 110 receives the incoming optical signal 123O and the optical signal 113O. That is, at least portions of the optical signals 123O and 113O are incident upon the detector 130. The incoming optical signal 123O conveys information that is typically unknown at the transceiver 110 prior to arrival of the incoming optical signal 123O. Meanwhile, the outgoing optical signal 113O conveys information that is often available or known to the transceiver 110 prior to launching the optical signal 113O onto the optical fiber 175.

In response to receiving the optical signal 123O and the optical signal 113O, the detector 130 of the transceiver 110 produces an electrical signal 113E+123E based on a composite of the incoming optical signal 123O and the outgoing optical signal 113O. In other words, the electrical signal 113E+123E output from the detector 130 comprises signal features associated with the incoming data 123 and the outgoing data 113.

As will be discussed in further detail below, the signal separation system 180 processes the electrical signal 113E+123E to determine the incoming data 123 and further to determine the power level 113P of the outgoing optical signal 113O. Once identified by the transceiver 110, the incoming data 123 feeds to the router 190 and the LAN 193 associated with the transceiver 110. The transceiver 110 also adjusts the laser 111 based on the determined power level 113P, for example to compensate for aging or temperature drift.

At the opposite end of the optical link provided by the optical fiber 175, the transceiver 120 comprises the laser 121 and the detector 130. The transceiver 120 modulates the laser 121 according to the data 123, which is outgoing from the perspective of the transceiver 120. Accordingly, the laser 121 produces the optical signal 123O. A portion of the optical signal 123O transmits over the optical fiber 175 for receipt at the transceiver 110 as discussed above. Another portion of the optical signal 123O emits from the rear of the laser 121 for receipt at the detector 130 of the transceiver 120. Meanwhile, the optical signal 113O transmitting over the optical fiber 175 towards the transceiver 120 (produced at the transceiver 110) transmits through the laser 121 for receipt at the detector 130.

Thus, the detector 130 of the transceiver 120 concurrently receives the optical signal 113O and the optical signal 123O and produces the electrical signal 113E+123E. Accordingly, the detector 130 receives light in which the optical signals 113O and 123O have been superimposed upon one another and converts that light into corresponding electrical signals 113E+123E. The electrical signal 113E+123E output by the detector 130 of the transceiver 120 thus contains signal features representing an overlay of the data 113 and the data 123. In other words, the electrical signal 113E+123E within the transceiver 120 comprises features associated with the data 113 superimposed with features associated with the data 123.

The signal separation system 180 of the transceiver 120 processes the electrical signals 113E+123E to distinguish the incoming data 113 and to determine the laser power 123P. Thus, the signal separation system 180 identifies incoming data 113 and can set the laser 121 to emit the optical signals 123O with appropriate intensity.

Figure 2A:
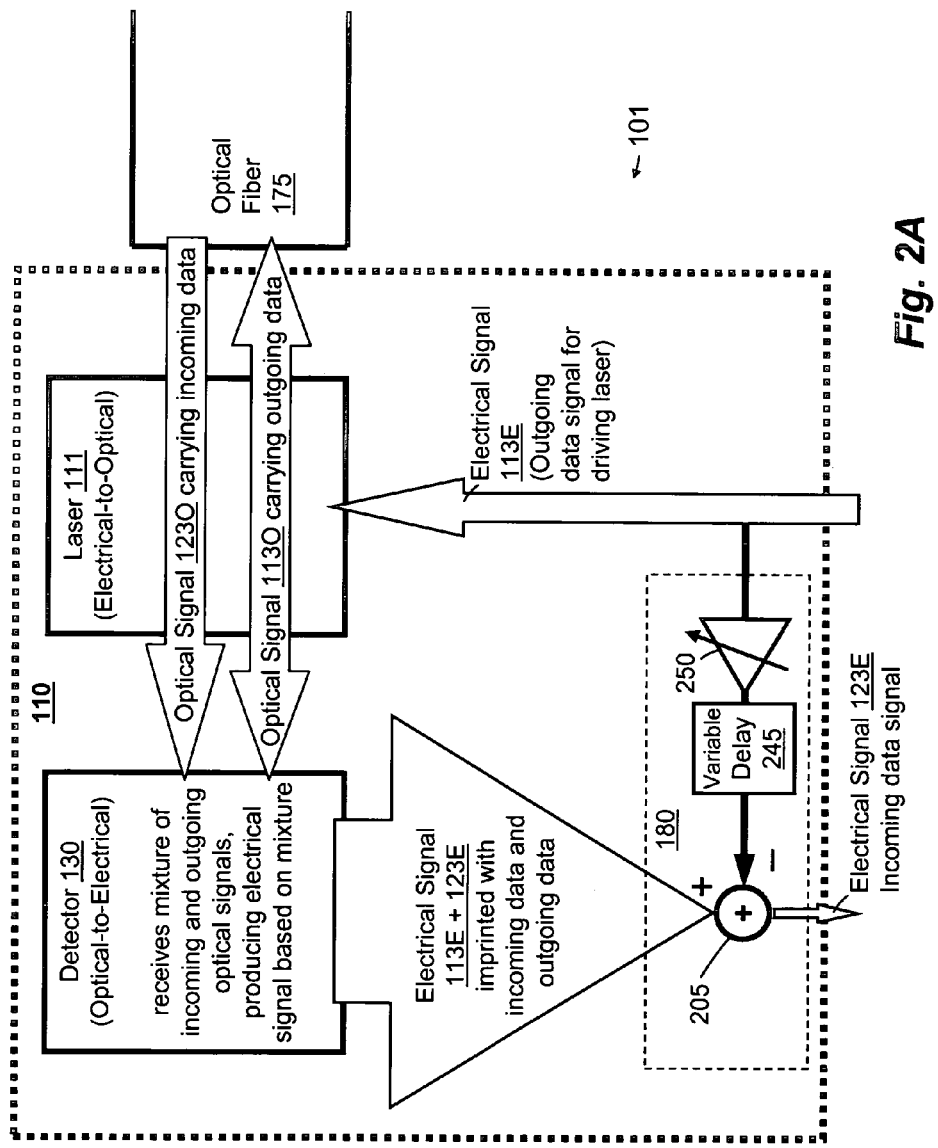
FIG. 2A is a functional block diagram illustration of a terminal of an optical network in accordance with certain exemplary embodiments of the present invention.
Figure 2B:
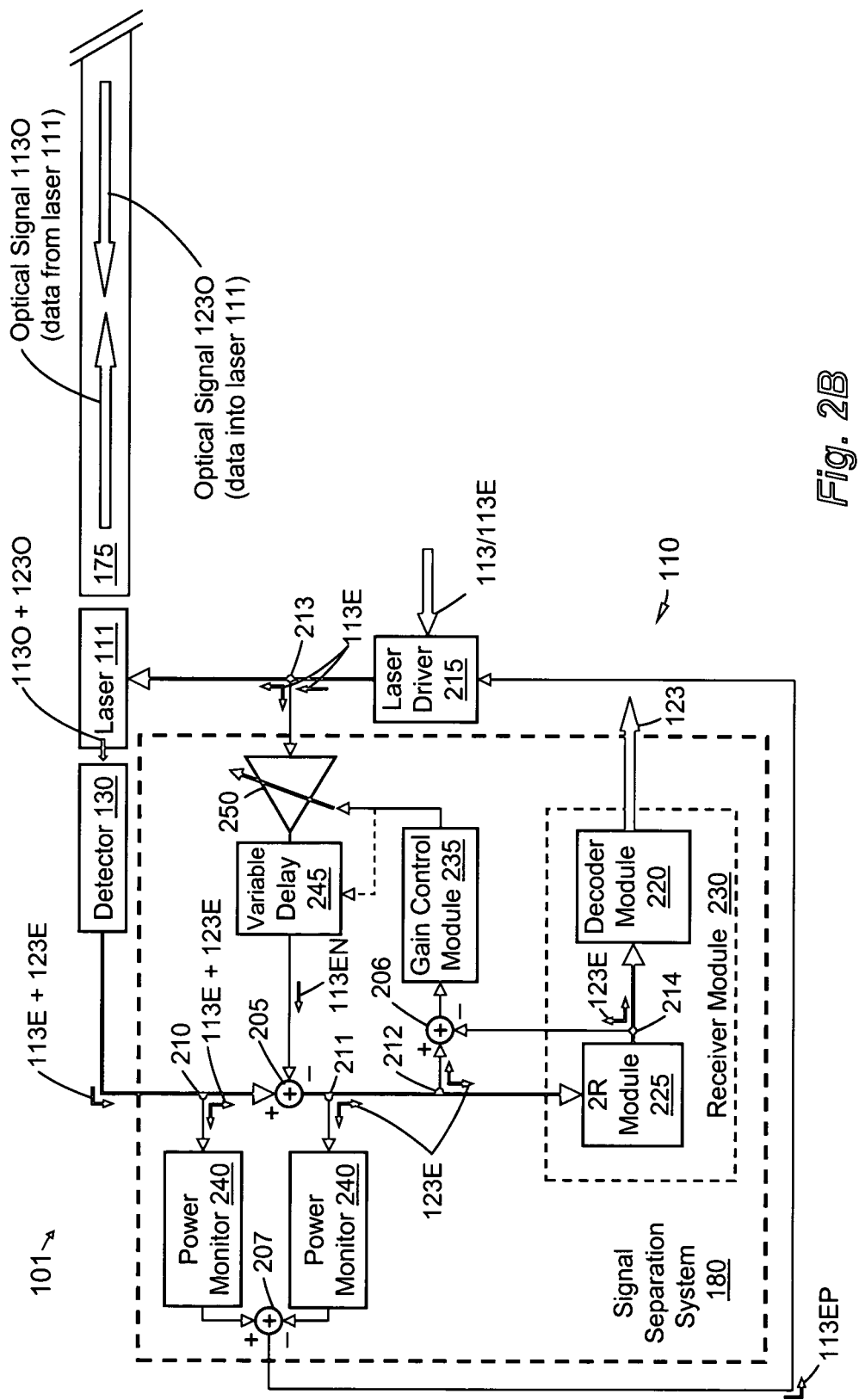
FIG. 2B is a functional block diagram illustration of a terminal of an optical network, providing additional detail as compared to FIG. 2A, in accordance with certain exemplary embodiments of the present invention.
Figure 2C:
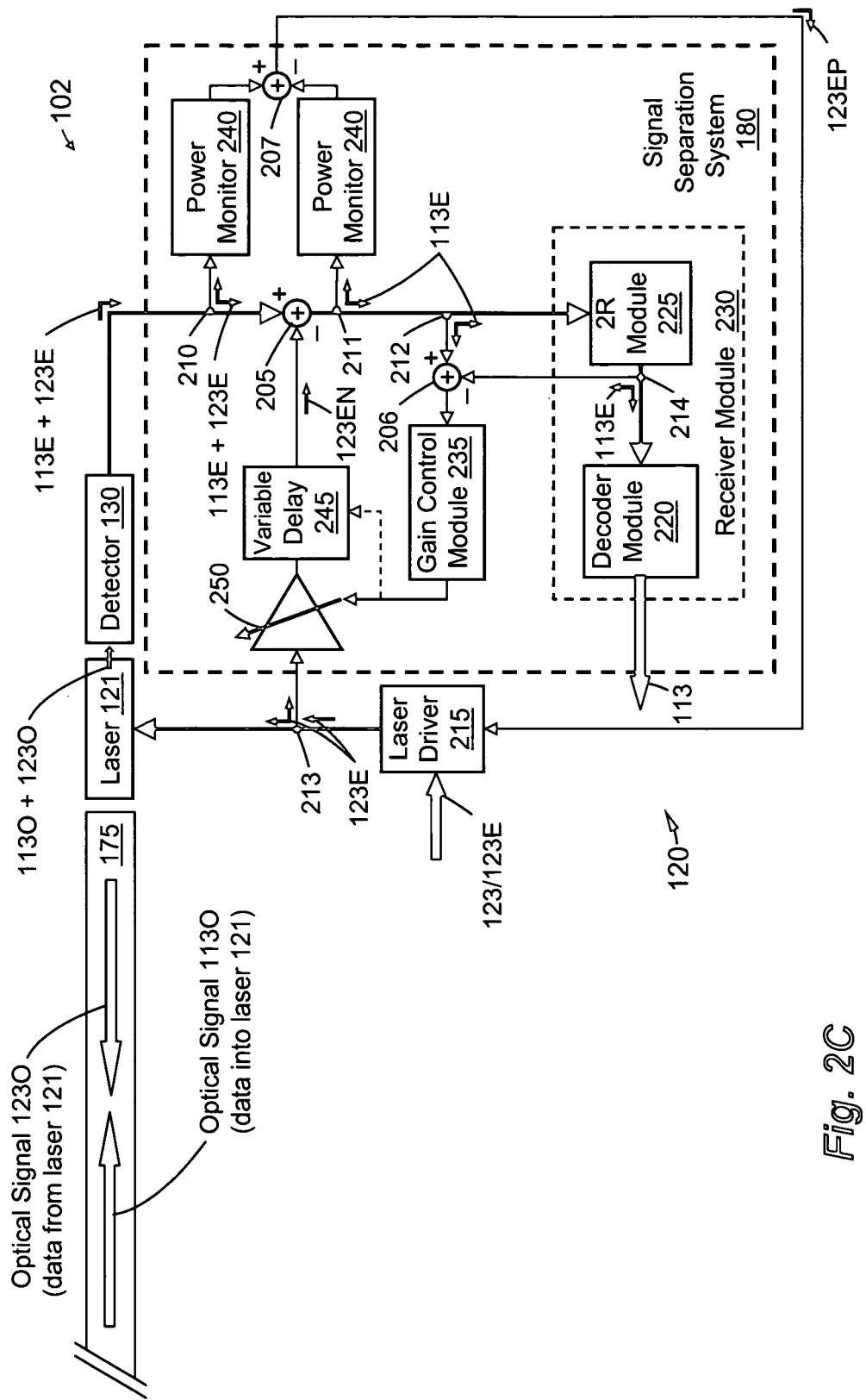
FIG. 2C is a functional block diagram illustration of a terminal of an optical network in optical communication with the terminal of FIGS. 2A and 2B, in accordance with certain exemplary embodiments of the present invention.

FIGS. 2A, 2B, and 2C (collectively FIG. 2) will now be discussed. FIG. 2A illustrates a functional block diagram of a terminal 101 of an optical network 100 in accordance with certain exemplary embodiments of the present invention. FIG. 2B illustrates a functional block diagram of a terminal 101 of an optical network 100, providing additional detail as compared to FIG. 2A, in accordance with certain exemplary embodiments of the present invention. FIG. 2C illustrates a functional block diagram of a terminal 102 of an optical network 100 in optical communication with the terminal 101 of FIGS. 2A and 2B, in accordance with certain exemplary embodiments of the present invention.

FIGS. 2A and 2B illustrate an exemplary embodiment of the transceiver 110 shown in FIG. 1 and discussed above.

In one exemplary embodiment, the transceiver 110 comprises multiple components, elements, or material systems in a common enclosure. The transceiver 110 can comprise various discrete electrical, digital, electronic, optical, and optoelectronic components. In certain exemplary embodiments, the transceiver's optical, optoelectronic, and electrical circuitry elements discussed below are provided in a common material system such as lithium niobate or indium phosphide. Furthermore, those optical, optoelectronic, and electrical circuitry elements can be grown on a common substrate. In one exemplary embodiment, the transceiver 110 comprises a PLC or a PIC. Thus, a PLC or a PIC can provide a platform for the transceiver's optical, optoelectronic, and electrical circuitry elements, which are discussed below.

In certain exemplary embodiments, the components of the transceiver 110 that are described below (including but not limited to the elements of FIG. 2A that have associated reference numbers) can be mounted on a substrate, such as a plate, block, sheet, wafer, or slab of material, with a composition of glass, silica, sapphire, aluminum oxide, ceramic, or silicon, for example. In one exemplary embodiment, those components are integrated in or grown on a semiconductor material, such as a silicon-based material, InGaAs, germanium, InP, III-V material, III-V semiconductor material, etc. Those components can be either monolithically integrated or hybrid integrated, for example. Moreover, they can be grown on, embedded in, or bonded to a common substrate. Accordingly, the transceiver's optical, optoelectronic, and/or electronic components can be a unitary structure, a monolithic system or "chip," or a collection of elements fastened or bonded together.

Turning now to discuss examples of architecture and operations, the transceiver 110 receives an electrical signal 113E conveying data 113 from the router 190 (shown in FIG. 1) and feeds that electrical signal 113E (and data 113) to the laser driver 215. The laser driver 215 conditions and/or processes the incoming electrical signal 113 (with the data 113) to provide a suitable format and suitable signal properties for modulating the laser 111. Laser modulation can be implemented via "direct modulation" or via external modulation (for example using a Lithium Niobate modulator, a Mach-Zehnder interferometer, or an electroabsorption modulator ("EAM").

The transceiver 110 can further comprise a serialer/deserializer ("SerDes") capability for converting the data 113 from a parallel format, transmitted over a multi-line bus, to a serial format for transmission over a single line. The data 113 can transmit into the transceiver 110 over 8, 16, or 32 parallel lines, with each line transmitting at a relatively low speed. Then, a SerDes chipset can aggregate and channel that parallel data onto a single line for serial transmission. The single line transmits the data 113 in serial format at a much higher speed than the data rate of any single one of parallel data lines. The laser driver 215 feeds a corresponding signal 113E, serially encoded with the data 113, to the laser 111.

In one exemplary embodiment, the laser driver 215 outputs a current signal encoded with the data 113. In other words, the laser driver 215 can receive signals in which voltage is modulated and output signals in which current is modulated. In one exemplary embodiment, the laser driver 215 comprises one or more amplifiers for providing suitable signal amplitude, for example adding an offset signal intensity. In one exemplary embodiment, the laser driver 215 processes the electrical signal 113 so the laser 111 does not "break threshold" under direct modulation.

In an exemplary embodiment, the laser driver 215 can comprise laser driver circuitry, for example an integrated circuit "chip," as commercially available from Maxim Integrated Products, Inc. of Sunnyvale, Calif. In one exemplary embodiment, the laser driver 215 comprises laser driver circuitry as commercially available from Mindspeed Technologies, Inc. of Newport Beach, Calif. In one exemplary embodiment, the laser driver 215 comprises an off-the-shelf driver supplied by Analog Devices, Inc. of Norwood, Mass. Moreover, these three companies supply circuit components useful for making other aspects of circuitry (discussed below) for exemplary embodiments of the transceivers 110, 120.

The laser driver 215 outputs the electrical signal 113E to the laser 111. In response, the laser 111 produces the optical signal 113O. As discussed above, the optical signal 113O is encoded or imprinted with the data 113. In other words, the optical signal 113O comprises a variation in intensity, phase, amplitude, polarization, wavelength, or some other property or parameter, and that variation represents or corresponds to the data 113.

Figure 3:
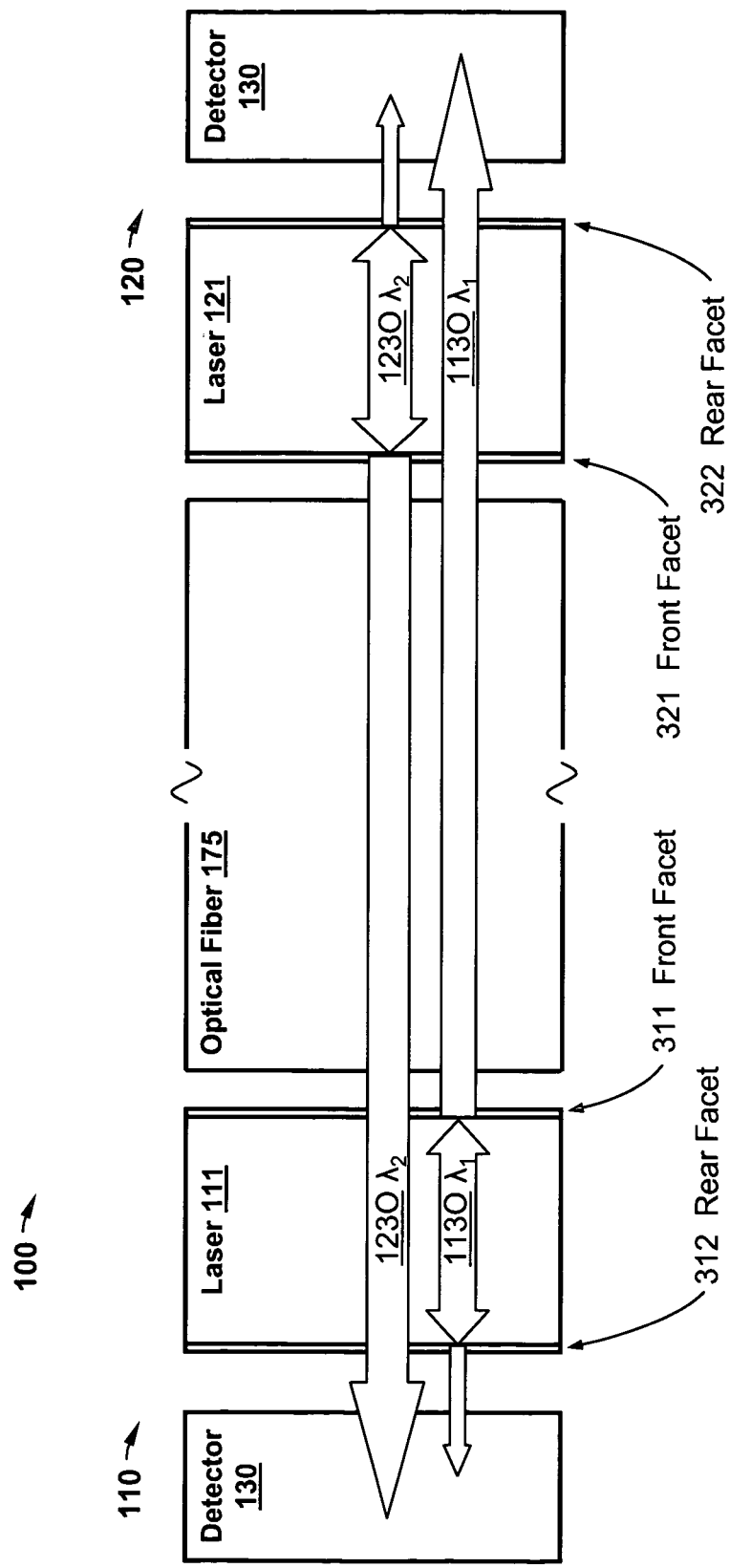
FIG. 3 is a functional block diagram illustration of an optical link of an optical network in accordance with certain exemplary embodiments of the present invention.

The laser 113 outputs the optical signal 113O through that laser's front and rear facets 311, 312 as shown in FIG. 3 and discussed below. Accordingly, the optical signal 113O emits from two ports of the laser 111, and the optical signal 113O travels both to the transceiver 120 (via the optical fiber 175) and to the detector 130 of the transceiver 110. The term "port," as used herein, generally refers to a place of entry or exit, a passageway, an inlet or an outlet, an entrance or an exit, an input or an output, a connection, a connection point, a passage, or a line through which signals (optical, electrical, etc.) or data transmit into and/or out of a device or a system. As will be discussed in further detail below, the detector 130 of the transceiver 110 also receives the incoming optical signal 123O (produced at the transceiver 120), and outputs an electrical signal 113E+123E having features corresponding to both the incoming optical signal 123O and the outgoing optical signal 113O.

The circuitry of the transceiver 110 comprises a provision, exemplarily embodied in the tap 213 illustrated in FIG. 2B, for feeding a portion or a sample of the signal 113E to the signal separation system 180. The tap 213 can comprise a circuit node, an intersection of two circuit traces, or active circuitry for sampling the electrical signal 113E propagating between the laser driver 215 and the laser 111. In an exemplary embodiment, the tap 213 has sufficient impedance or isolation (or alternatively lack of impedance if deployed in series) to avoid loading the electrical signal 113E in a detrimental manner. In other words, the tap 213 samples the electrical signal 113E without inducing significant signal degradation that might negatively impact operation of the laser 111.

As will be discussed in further detail below, the signal separation system 180 processes the tapped portion of the signal 113E and applies the resulting negating signal 113EN to the output of the detector 130 of the transceiver 110. The application of the negating signal 113EN reveals the incoming data 123 encoded on the optical signal 123O and further characterizes the power of the outgoing optical signal 113O.

As shown in FIGS. 2A and 2B, the signal separation system 180 of the transceiver 110 comprises a variable delay 245 and an adjustable amplifier 250 for processing the sample of the electrical signal 113E obtained by the tap 213. More specifically, the variable delay 245 and the adjustable amplifier 250 (and the associated circuit traces) model the response of the detector 130 (of the transceiver 110) to the portion of the outgoing optical signal 113O incident on that detector 130. The variable delay 245 and the adjustable amplifier 250 transform the sample of the signal 113E obtained by the tap 213 into the negating signal 113EN. (FIG. 2B illustrates the negating signal as the arrow 113EN between the variable delay 245 and the node 205.)

The negating signal 113EN approximates the portion of the electrical signal 113E+123E (output by the detector 130 of the transceiver 110) that is due to the outgoing optical signal 113O. The node 205 subtracts the negating signal 113EN from the signal 113E+123E output from the detector 130. As a result of that subtraction, the node 205 outputs the electrical signal 123E, and that electrical signal 123E approximates (or essentially is) the electrical-domain equivalent of the incoming optical signal 123O. The negating signal 113EN can be viewed an approximation of aspects of the data 113 on the electrical signal 113E+123E output by the detector 130.

In an alternative explanation, the detector 130 outputs the electrical signal 113E+123E imprinted with the data 113 and the data 123E. The variable delay 245 and the adjustable amplifier 250 create an approximation of the aspects of the electrical signal 113E+123E that are due to the data 113. Based on that approximation, the node 205 removes (or suppresses) the imprints of the data 113 from the signal 113E+123E. As a result of the removal, the node 205 outputs the electrical signal 123E imprinted with the data 123, with little or no imprints of the data 113 remaining. In one exemplary embodiment, the electrical signal 123E carries the data 123E exclusively. However, some residual encoding of the data 113 may remain on the electrical signal 123E (for example as signal artifacts), with the residual remainder cleaned up or addressed as discussed below.

The adjustable amplifier 250 applies an appropriate level of gain to the sample of the signal 113E output by the laser driver 215 so that at the input node 205, the result (the negating signal 113EN) has an appropriate intensity or amplitude. That is, the adjustable amplifier 250 provides sufficient gain (which may comprise attenuation, amplitude reduction, amplification, or amplitude increase) so that the node 205 applies a sufficient amplitude for negating the portion of the signal 113E+123E associated with the outgoing data 113. In other words, the negating signal 113EN has appropriate amplitude for negating a portion of the signal 113E+123E output by the detector 130.

In one exemplary embodiment, the laser driver 215 outputs a current signal, the detector 130 outputs a voltage signal, and the adjustable amplifier 250 process a sample of the current signal (obtained via tap 213) to provide a voltage signal of like format to the output of the detector 130. Thus, the adjustable amplifier 250 can provide compatibility with the output of the detector 130.

In one exemplary embodiment, the laser driver 215 outputs the electrical signal 113E in the form of a current signal. The tap 213 comprises a resistor that the current signal flows through, thus producing a voltage. The adjustable amplifier 250, operating with high input impedance, receives and processes the voltage from the tap 213.

In one exemplary embodiment, the adjustable amplifier 250 can comprise an inverting operational amplifier configuration with a variable resistor (for example a voltage-controlled resistor) or load in a feedback loop. The gain can be controllable according to the variable resistor. Various other embodiments of adjustable amplifiers 250 are available to one of ordinary skill in the art having benefit of the disclosure, via off-the-shelf-components, integrated circuit chips, various designs described in patent and technical literature, etc.

The variable delay 245 compensates for differences in signal propagation time between the two signal paths—one path extending from the tap 213 to the laser 111, to the detector 130, and to the node 205; the other path extending from the tap 213 to the adjustable amplifier 250, to the variable delay 245, and to the node 205. Accordingly, the variable delay 245 provides the node 205 with an electrical signal (the negating signal 113EN) having a phase and timing matching the phase and timing of the portion of the signal 113E+123E that is associated with the data 113. In other words, at the node 205, the negating signal 113EN is timed and phase matched to the portion of the signal 113E+123E that is to be removed.

Exemplary suppliers of variable delay lines include: ELMEC Technology of America, Inc. of San Mateo, Calif.; Maxim Integrated Products, Inc. of Sunnyvale, Calif.; and Data Delay Devices, Inc. of Clifton, N.J.

U.S. Pat. No. 6,028,462, issued Feb. 22, 2000 to Kyles, describes tunable delay technology that may be incorporated into an exemplary embodiment of the signal separation system 180.

In one exemplary embodiment, a fixed delay line is substituted for the variable delay 245. In other words, the transceiver 110 can comprise circuit paths of known, fixed delay (or phase shift). The two circuit paths between the tap 213 and the node 205 (one through the laser 111 and the detector 130, the other through the adjustable amplifier 250) can have essentially the same, fixed delay. With equivalent delays, the timing and/or phase of the signals at the node 205 match sufficiently to support negation or cancellation of relevant signal features. According, in an exemplary embodiment, the variable delay 245 can be optional and can be replaced with a fixed delay, and that fixed delay can comprise a circuit trace of sufficient length or an appropriate component that provides additional delay (beyond that of the circuit trace).

In one exemplary embodiment, the circuit extending between the tap 213 and the node 205 comprises a filter (not illustrated as a separate component) for shaping the negating signal 113EN to match or approximate the portion of the signal 113E+123E output by the detector 130 that is associated with the outgoing data 113. Such a filter can provide matching "roll off." In an exemplary embodiment, the filter can attenuate (or amplify) high-frequency signal components, low-frequency signal components, or a specific frequency band. In an exemplary embodiment, the filter can apply frequency-selective gain or attenuation to improve signal negation/cancellation. In one exemplary embodiment, the filter provides a transformation, e.g. in the frequency domain, that approximates the effect of the laser 111, the detector 130, and the associated circuitry on the electrical signal 113E output by the laser driver 215 and the associated optical signal 113O.

The filter can be a separate component (or feature in an integrated circuit) in series with the variable delay 245 and the adjustable amplifier 250. In one exemplary embodiment, filter is adjustable, tunable, or controllable. The filter can be located before, between, or after the variable delay 245 and the adjustable amplifier 250. Alternatively, either the adjustable amplifier 250 or the variable delay 245 can comprise the filter. The filter can apply a tunable or adjustable amount of gain or attenuation over a preset or an adjustable set of frequencies/bandwidths. In one exemplary embodiment, the filter comprises a finite impulse filter. In one exemplary embodiment, the filter comprises a tapped delay line or an adaptive tapped delay line filter.

In one exemplary embodiment, the filter comprises a voltage controlled filter whose operating characteristics can be controlled via a control voltage applied to an input terminal of the filter. The filter's "Q factor" and/or cutoff frequency (or cut-on frequency) can be varied continuously. Further, the filter may be switched between operating in two or more modes, such as among low-pass, high-pass, band-pass, and notch modes. The filter may provide a switchable slope that impacts how quickly certain signals (e.g. those outside the pass band) become attenuated.

U.S. Pat. No. 6,545,567, issued Apr. 8, 2003 to Pavan et al., provides additional information about exemplary embodiments of programmable analog tapped delay line filters. Similarly, U.S. Pat. No. 7,158,567, issued Jan. 2, 2007 to Wang et al., provides information about exemplary filters that can be controlled to shape or otherwise manage a signal. An exemplary embodiment of the signal separation system 180 can comprise one or more of the technologies disclosed in U.S. Pat. Nos. 6,545,667 and 7,158,567.

The gain control module 235 changes, controls, manipulates, adjusts, or sets the delay provided by the variable delay 245, the gain applied by the adjustable amplifier 250, and the level of filtering or response of the filter, if present. More specifically, the gain control module 235 changes respective parameters of the variable delay 245, the adjustable amplifier 250, and the filter (adjustable, tunable, or controllable) in order to improve a match between (i) the negating signal 113EN feeding into the node 205 and (ii) the portion of the signal 113E+123E output by the detector 130 associated with the outgoing data 113. In other words, the gain control module 235 makes dynamic changes or updates in order to reduce residual signal features (for example signal artifacts or signal imprints) attributable to the outgoing data 113, thereby refining or improving the signal 123E output by the node 205. The changes can compensate for aging of the detector 130, changes in optical dispersion of material through which the optical signal 113O and/or the optical signal 123O propagate, temperature shifts, changes in supply voltage, amplitude fluctuations, etc.

The node 206 feeds the gain control module 235 a signal that is the difference between the output of the node 205 and the output of the reshape and retime ("2R") module 225. The tap 212 provides the node 206 with a sample of the output of the node 205. The tap 214 provides the node 206 with a sample of the output of the 2R module 225. Exemplary embodiments of those taps 212, 214 (as well as the other illustrated taps 210, 212, 213) can be passive or active, for example having sufficient impedance to avoid excessively loading or degrading the sampled signal.

The node 206 provides an indication of the quality of the signal output by the node 205. If the signal 123E output from the node 205 is of high quality or fidelity, then the 2R module 225 may apply only a small level of signal processing for reshaping and retiming (because the signal 123E cleanly carries the data 123 with little residual features or artifacts from the outgoing data outgoing 113. In other words, if the 2R module 230 applies only a small amount of signal processing in connection with recovering the data 123, then the node 206 will have two inputs that are similar to one another, and the node 206 will compute a difference (via subtracting one input from the other) between those two inputs that is small or low. This condition indicates that the variable delay 245, the adjustable amplifier 250, and the filter (adjustable, tunable, or controllable) are applying appropriate signal conditioning parameters and that the negating signal 113EN is appropriate. According, the gain control module 235 makes little or no change to those parameters.

On the other hand, the variable delay 245, the adjustable amplifier 250, and the filter may be in an operational state in which they poorly model the response of the detector 130, the laser 111, and the associated circuitry that translates of a portion of the outgoing optical signal 113O from the optical domain to the electrical domain). In such an operational state, the output of the node 205 will contain residual imprints of the outgoing data 113 (or jitter or some other signal deficiency, defect, or artifact). The 2R module 225 will apply a relatively high amount of signal processing to remove those residual imprints, jittering, artifacts, etc. And, via performing a subtraction, the node 206 will output an indication that the 2R module 225 implemented significant signal processing changes. In this situation, the gain control module 235 adjusts the respective signal processing parameters of the variable delay 245, the adjustable amplifier 250, and the filter.

In other words, the node 206 computes an error signal that indicates how well the signal processing of the variable delay 245, the adjustable amplifier 250, and filter models the signal path that extends from the tap 213, through the laser 111, and through the detector 130. If the error signal is large, the gain control module 235 applies high levels of correction to the delay (or phase) of the variable delay 245, the gain of the adjustable amplifier 250, and the controllable filtering parameters of the filter. If the error signal is smaller, the gain control module 235 makes less aggressive corrections. Those corrections may be positive or negative according to whether the error is positive or negative, for example. If the error signal is within a dead band or a designated range of values, the gain control module 235 may provide no corrections.

Accordingly, the signal separation system 180 comprises a feedback control loop for setting the variable delay 245, the adjustable amplifier 250, and the filter. The feedback control loop makes dynamic changes or updates to optimize, to continually improve, or to adjust the settings based on an error signal provided in part by the 2R module 225. Thus, the gain control module 235 typically comprises a controller.

In an exemplary embodiment, the gain control module 235 can comprise an automatic control circuit or program, which may be digital or analog or a hybrid between digital and analog. In one exemplary embodiment, the gain control module 235 comprises a proportional plus integral ("PI") controller. In one exemplary embodiment, the gain control module 235 comprises a proportional plus integral plus derivative ("PID") controller. In various other exemplary embodiments, the gain control module 235 can comprise a Kalman filter, a stochastic filter, a deadbeat controller, a multivariate controller, a least-squares computation, an anti-reset windup provision, a feed forward correction, a digital controller, an analog controller, fuzzy logic, cascaded control, microprocessor-based control, or some other effective feedback control loop or appropriate automatic feedback control means.

In one exemplary embodiment, the gain control module 235 manipulates the signal processing parameters via parameter search methodology described or disclosed in U.S. Pat. No. 7,158,567 to Wang et al. For example, that patent describes, inter alia, processes for manipulating a controllable filter in connection with forward error correction ("FEC"). One of ordinary skill in the art having benefit of the present disclosure would be able to incorporate one (or more) of those processes from U.S. Pat. No. 7,158,567 into the gain control module 235 for controlling the variable delay 245, the adjustable amplifier 250, and/or the filter (which is adjustable, controllable, or tunable) without undue experimentation.

In an exemplary embodiment, in support of storing and operating feedback control instructions, the gain control module 235 can comprise a microprocessor (not shown) or other digital circuitry such as flash memory, random access memory ("RAM"), a digital-to-analog converter ("DAC"), an analog-to-digital converter ("ADC"), etc. Flash memory can support software revisions or upgrades transmitted over the optical network 100 to the transceiver 110. The gain control module 235 can utilize RAM for data storage and program execution. An ADC can digitize the output of the node 206, which as discussed above characterizes performance or represents error. Prior to digitization, the output can be filtered to damp, smooth, or average high-frequency variation. Accordingly, the gain control module 235 can operate on a digital error signal having much fewer samples in any given second than the data rate (per second) of the outgoing or the incoming optical signal 113O, 123O. In most instances, the gain control module 235 can have a response time in a range of milliseconds, seconds, or perhaps some larger unit of time. A DAC can generate control voltages or currents that manipulate, manage, or control the variable delay 245, the adjustable amplifier 250, and the filter. The gain control module 235 can further comprise a timer for managing pulses, measuring time between signal events, or helping control signal synchronization, for example.

The gain control module 235 can connect to, comprise, or otherwise access assorted types of memory that may hold instructions. Such memory can include any one or combination of volatile memory elements (e.g., forms of RAM such as DRAM, SRAM, SDRAM, etc.), nonvolatile memory elements (e.g., ROM, hard drive, tape, compact disc read-only memory ("CDROM"), etc.), and erasable memory (e.g. erasable programmable read only memory ("EPROM") and electrical EPROM ("EEPROM")). Moreover, the gain control module 235 may incorporate electronic, magnetic, optical, and/or other types of storage media and can have a distributed architecture, where various components are situated remote from one another, but can be accessed over a network. Instructions for operating the gain control module 235, including parameter optimization routines, can be stored in a computer-readable medium.

A "computer-readable medium" can be any means that can store, communicate, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM (electronic), a read-only memory ("ROM") (electronic), an erasable programmable read-only memory (EPROM, EEPROM, or Flash memory) (electronic), a data stick, and a portable CDROM (optical). Note that a computer-readable medium could even be paper or another suitable medium upon which the program is printed, as the program can be electronically captured, via for instance optically scanning the paper or other medium, then compiled, interpreted or otherwise processed in a suitable manner if necessary, and then stored in a computer memory.

The gain control module 235 can also include logic implemented in hardware with any or a combination of the following technologies: a discrete logic circuit(s) having logic gates for implementing logic functions upon data signals, an application-specific integrated circuit ("ASIC") having appropriate combinational logic gates, a programmable gate array(s) ("PGA"), a field programmable gate array ("FPGA"), etc.

It should be apparent that one of ordinary skill in the art would be able to make and operate the gain control module 235 (as well as the other items described herein associated with exemplary embodiments of the present invention) without difficulty and without undue experimentation based on the figures, illustrations, exemplary functional block diagrams, flow charts, and associated descriptions in the application text, for example. Therefore, additional disclosure of a particular set of program code instructions or more particularized circuit schematics for the gain control module 235 is not considered necessary for an adequate understanding of how to make and use the present invention.

Moving now to discuss the receiver module 230, in an exemplary embodiment, the 2R module 225 re-times (or re-clocks) and re-shapes the signal 123E to ensure high signal quality. The 2R module 225 can also provide amplification in connection with signal recovery. In an exemplary embodiment, the 2R module 225 comprises a phase lock loop ("PLL").

The 2R module 225 can comprise circuitry (for example integrated circuit ("IC") chips, monolithic devices, multichip modules, discrete element, etc.) available from Maxim Integrated Products, Inc. of Sunnyvale, Calif.; Vitesse Semiconductor Corporation of Camarillo, Calif.; Mindspeed Technologies, Inc. of Newport Beach, Calif.; and Conexant Systems, Inc. of Newport Beach, Calif. Those companies supply integrated circuits, solutions, schematic designs, and chip sets.

In certain exemplary embodiments, the 2R module 225 is fabricated using Maxim GST-2 27 GHz-ft silicon bipolar technology, for example as a low power monolithic clock and data recovery integrated circuit. The 2R module 225 may alternatively (or also in some situations) comprise the integrated circuit element marketed by Maxim under the product designation "MAX3780."

The decoder module 220 processes the signal 123E from the 2R module 225 to provide data signals or symbols formatted or suited for reception by other computing, data, or communication devices, for example the router 190 illustrated in FIG. 1 an discussed above. In an exemplary embodiment, the decoder module comprise SerDes circuitry. Decoder circuitry and SerDes chip sets are available from suppliers of communication chips, several of which have been discussed above.

In an exemplary embodiment, the decoder module 220 comprises a SerDes chip set for converting the incoming data 123 from a series format to a parallel format. As discussed above, transmitting the data 123 in a parallel format over multiple data lines, rather than in a serial format over a single data line, offers a benefit of reducing the transmission speed of any single data line. As discussed above with reference to FIG. 1, the incoming data 123 can flow out of the transceiver 110 to a router 190, a LAN 193, and/or some other system.

In addition to determining the incoming data 113 via processing the signal 113E+123E output by the detector 130, an exemplary embodiment of the signal separation system 180 illustrated in FIG. 2B determines the power level of the outgoing optical signal 113O. The transceiver 110 provides that power level to the laser driver 215 as a feedback signal, specifically the power monitoring signal 113EP. The laser driver 215 adjusts the electrical supply to the laser 111 in order to set or to maintain the outgoing optical signal 113O at an appropriate intensity level.

The exemplary signal separation system illustrated in FIG. 2B comprises two power monitors 240, each of which can be readily constructed from circuit elements well know in the art by one of ordinary skill in the art having the benefit of this disclosure. One power monitor 240 measures power on the circuit segment that extends between the detector 130 and the node 205, as sampled by the tap 210. The other power monitor 240 measures power on the circuit segment that extends between the node 205 and the 2R module 225, as sampled by the tap 211. Accordingly, one power monitor 240 assesses power of the total signal 113E+123E output by the detector 130. The other power monitor 240 assesses power of the signal 123E resulting from the negating function of the node 205.

The node 207 implements a subtraction to compute a difference between the two power levels respectively identified by the two power monitors 240. The node 207 can compute the difference via a subtraction occurring in the node 207. Alternatively, the node 207 can add two signals, wherein one has been inverted (effectively providing a "negative" signal) in advance of entering the node 207. That is, a signal subtraction can comprise adding two signals, wherein one of the two signals has been preprocessed so that the combined effect of the preprocessing and the addition results in subtraction. (Exemplary embodiments of the nodes 205 and 206 can provide difference values or subtractions in a similar manner.)

In an exemplary embodiment, the node 207 and the associated power monitors 240 effectively implement the following equation: (Power of Signal 113E+123E)−(Power of Signal 123E)=Power of Signal 113E. Appropriate compensation can further be applied to correct for any deviation from linearity that may result, for example.

Since the power of the electrical signal 113E corresponds to the power of the optical signal 113O output by the laser 111, the node 207 provides a measurement or an indication of operational state of the laser 111. Further, the node 207 outputs a power monitoring signal 113EP that describes the power of the optical signal 113O transmitting over the optical fiber 175.

The power monitoring signal 113EP transmits to the laser driver 215. The laser driver 215 uses the power monitoring signal 113EP as a sensory input or as a feedback signal. More specifically, the laser driver 215 adjusts a signal parameter, such as intensity or direct current offset, of the signal 113E that the laser driver 215 feeds to the laser 111 as discussed above. Accordingly, the laser driver 215 can control the laser 111 for outputting a settable or adjustable level/intensity of light. Additionally, the laser 111 can be operated to compensate for environment fluctuations or other influences that might otherwise change the intensity of the optical signal 113O in an unintended manner.

As discussed above, the transceiver 110 is in optical communication with the transceiver 120 illustrated in FIG. 2C, and the two transceivers 110, 120 exchange information. Referring now to FIG. 2C, the transceiver 120 operates in a similar manner to the transceiver 110 shown in FIG. 2B and, in an exemplary embodiment, comprises many common elements arranged in a common architecture.

The signal separation system 180 of the transceiver 120 can be a copy of the signal separation system 180 of the transceiver 110. Thus, the two signal separation systems 180 can each be fabricated to a common design, may have common part numbers, or meet essentially the same specification. Nevertheless, the two signal separation systems 180 can have some differences, for example associated with manufacturing tolerances.

The laser driver 215 of the transceiver 120 receives the data 123 for outgoing transmission, intended for reception at the transceiver 110. The laser driver 215 of the transceiver 120 modulates the laser 121 according to that outgoing data 123. In response, that laser 121 emits the optical signal 123O. One fraction of the optical signal 123O transmits over the optical fiber 175 towards the detector 130 of the transceiver 110, while another fraction emits towards and is received by the detector 130 of the transceiver 120.

The detector 130 of the transceiver 120 produces an electrical signal 113E+123E that comprises signal features associated with the incoming data 113 and the outgoing data 123. The signal separation system 180 of the transceiver 120 processes the signal 113E+123E output by the detector 130 of the transceiver 120. As described above with respect to the transceiver 110, that processing determines the power of the optical signal 123O and identifies the data 113 conveyed by the incoming optical signal 113O. The laser driver 215 uses the power monitoring signal 123EP from the signal separation module 180 to control the laser 121 of the transceiver 120. The transceiver 120 outputs the data 113 for reception and subsequent processing by the router 190, or some other appropriate computing or communication device.

As discussed above with reference to FIG. 2B, the signal separation system 180 of the transceiver 120 delays, amplifies, and filters a sample of the electrical signal 123 output by the laser driver 215. The delay, amplification, and filtering models the response of the laser 121 and the detector 130, thereby creating an approximation of aspects of the signal 113E+123E (output by the detector 130) that are associated with the outgoing data 123. Applying that approximation to the signal 113E+123E negates those signal aspects, leaving a signal 113E that represents the data 113 with high-fidelity.

Turning now to FIG. 3, this figure illustrates a functional block diagram of an optical link of an optical network 100 in accordance with certain exemplary embodiments of the present invention. More specifically, FIG. 3 illustrates additional details of the optical operation of the optical network 100 discussed above with reference to FIGS. 1 and 2A, 2B, and 2C.

The laser 111, which is an exemplary component of the transceiver 110, comprises a front facet 311, facing the optical fiber 175 and a rear facet 312 facing the detector 130. The laser 111 lases in response to light amplification as light resonating, circulating, or bouncing back and forth between the front facet 311 and the rear facet 312. Thus, the front and rear facets 311, 312 provide a lasing cavity, a laser cavity, or a resonant cavity.

The laser 111 emits the optical signal 113O through the front facet 311 and the rear facet 312. The portion of the optical signal 113O passing through the front facet 311 transmits over the optical fiber 175; is incident on the front facet 321 of the laser 121; passes through the front facet 321 of the laser 121; passes through the laser 121 (typically including the laser's gain medium); is incident upon the rear facet 322 of the laser 121; passes through the rear facet 322 of the laser 121; and is incident upon and is received by the detector 130 of the transceiver 120. As discussed above, the detector 130 of the transceiver 120 converts incident light into the electrical domain for processing by that transceiver's signal separation system 180.

Light resonates, circulates, or bounces back and forth between the front facet 321 and the rear facet 322 of the laser 121, in like manner to light production in the laser 121 as discussed above. Successive passes through a gain medium (or a gain media) disposed between the front facet 321 and the rear facet 322 amplify light to provide the optical signal 123O. Thus, the front and rear facets 311, 312 provide a lasing cavity, a laser cavity, or a resonant cavity for light amplification and stimulated light emission.

The laser 121 of the transceiver 120 emits the optical signal 123O through its rear facet 322, which faces the detector 130 and its front facet 321, which faces the optical fiber 175. The portion of the optical signal 123O passing through the front facet 321 transmits over the optical fiber 175; is incident on the front facet 311 of the laser 111; passes through the front facet 311 of the laser 111; passes through the laser 111 (for example through the laser's gain medium); is incident upon the rear facet 312 of the laser 111; passes through the rear facet 312 of the laser 111; and is incident upon and received by the detector 130 of the transceiver 110. As discussed above, the signal separation system 180 of the transceiver 110 processes the electrical output of its detector 130 to reveal optical power produced by the laser 111 and to reveal the data 123 sent by the laser 121.

In an exemplary embodiment, the optical signal 123O produced by the laser 121 has a distinct wavelength or color from the optical signal 113O produced by the laser 111. Thus, the optical signal 113O can have a wavelength of lambda one ("$\lambda_1$"), while the optical signal 123O can have a wavelength of lambda 2 ("$\lambda_2$"). The wavelength $\lambda_1$ can be aligned to one coordinate of a dense wavelength division multiplexing ("DWDM") grid, while the wavelength $\lambda_2$ can be aligned to a different coordinate of a DWDM grid. In one exemplary embodiment, the two wavelengths can be course wavelength division multiplexing ("CWDM") wavelengths or two wavelength division multiplexing ("WDM") wavelengths.

In an exemplary embodiment, the wavelength $\lambda_1$ can be at about 1310 nanometers ("nm"), while the wavelength $\lambda_2$ is about 1550 nm. In another exemplary embodiment, the two wavelengths are both in a window of transmission around 1550 nm. In another exemplary embodiment, the two wavelengths are both in a window of transmission around 1310 nm. In yet another exemplary embodiment, the two wavelengths are both between about 600 and 1100 nm. The two wavelengths can be less than one nm apart, a few nm apart, tens of nm apart, or a hundred or more nm apart.

As will be discussed in further detail below, the facets 312, 311, 321, 322 each have wavelength-selective transmission and reflection, for example provided by an optical filter. An optical filter generally is a device, structure, system, or feature providing light transmission and/or light reflection that varies according to light frequency, wavelength, or color. Various embodiments of filter can manipulate or manage light via diffraction, refraction, interference, thin-film interference, interferometers, gratings, absorption, scattering, amplification, holography, etc.

In an exemplary embodiment, thin-film coatings on the facets 312, 311, 321, 322 provide wavelength selectivity. That is, thin-film interference filters can reflect certain wavelengths of light while passing others. As an alternative to thin-film coatings, gratings can provide the wavelength selective properties, wherein a grating is a type of filter as the term "filter" is used herein. Such gratings can be distributed feedback gratings ("DFB"), distributed Bragg reflector ("DBR") gratings, fiber Bragg gratings, etc.

In alternative exemplary embodiments, the optical signals 113O and 123O can have different phases, intensities, polarizations, data rates, modulation styles, data, or some other parameter or property that supports distinguishing them with respect to one another.

Turning now to FIG. 4, this figure illustrates spectral plots 412, 411, 421, 422 of front and rear facets 311, 321, 312, 322 of two lasers 111, 121, respectively included in two terminals 101, 102, of an optical network 100 in accordance with certain exemplary embodiments of the present invention. Thus, these plots 412, 411, 421, 422 illustrate exemplary filtering characteristics. In an exemplary embodiment, the plots 412, 411, 421, 422 describe the optical characteristics of the laser facets 312, 311, 321, 322 of the transceivers 110, 120 illustrated in FIGS. 1, 2, and 3 and discussed above.

FIGS. 4A and 4B respectively describe the rear facet 312 and front facet 311 of the laser 111 of the transceiver 110. As shown in the plot 412 of FIG. 4A, a thin-film interference filter, adhering to the rear facet 312 of the laser 111, readily transmits at the wavelength $\lambda_2$ and reflects at the wavelength $\lambda_1$. As shown in the plot 411 of FIG. 4B, a thin-film interference filter, adhering to the front facet 311 of the laser 111, readily transmits at the wavelength $\lambda_2$ while reflecting at the wavelength $\lambda_1$.

Transmission of about 100 percent generally corresponds to reflectivity of zero percent, while transmission of zero percent generally corresponds to reflectivity of about 100 percent. That is, in an exemplary embodiment, light that is not transmitted is largely reflected, and light that is not reflected is largely transmitted.

Via the illustrated optical transmission characteristics at the wavelength $\lambda_2$ (for the laser 111), the optical signal 123O, that the laser 121 emits at the wavelength of $\lambda_2$, transmits freely through both the front facet 311 and the rear facet 312. That is, the high transmission and corresponding low reflectivity of the front and rear facets 311, 312 at the wavelength $\lambda_2$ supports the front and rear facet 311, 312 readily transmitting the optical signal 123O.

Meanwhile, the optical reflection characteristics at the wavelength $\lambda_1$ (for the laser 111) provides a resonant cavity that supports lasing at the wavelength $\lambda_1$. In other words, the laser 111 comprises a gain medium situated between two wavelength selective reflectors/filters that reflect at the wavelength $\lambda_1$. In response to the wavelength-selective reflection and the light amplification of the laser's gain medium, the laser 111 lases at the wavelength $\lambda_1$.

The reflectivity of the front facet 311 at wavelength $\lambda_1$ is something less than 100 percent so that some light at the wavelength $\lambda_1$ transmits through the front facet 311 to provide the optical signal 113O for fiber optic transmission. In an exemplary embodiment, the reflectivity of the rear facet 312 is also less than 100 percent at the wavelength $\lambda_1$ so that some of the optical signal 113O transmits through the rear facet 312 to provide a laser monitor signal for feedback power control of the laser 111, as discussed above. In an alternative embodiment, the rear facet 312 has reflectivity approaching 100 percent (and a correspondingly low transmission) at the wavelength $\lambda_1$, as power monitoring can be optional in many circumstances.

In one exemplary embodiment, the reflectivity of the rear facet 312 at the wavelength $\lambda_1$ can be about 99 percent, while the reflectivity of the front facet 311 is about 90 percent at the wavelength $\lambda_1$. In a second exemplary embodiment, the reflectivity of the rear facet 312 at wavelength $\lambda_1$ can be about 99 percent, while the reflectivity of the front facet 311 is about 80 percent at the wavelength $\lambda_1$. In a third exemplary embodiment, the reflectivity of the rear facet 312 at wavelength $\lambda_1$ can be about 95 percent, while the reflectivity of the front facet 311 is about 80 percent at the wavelength $\lambda_1$. In a fourth exemplary embodiment, the reflectivity of the rear facet 312 at wavelength $\lambda_1$ can be about 99 percent, while the reflectivity of the front facet 311 is about 70 percent at the wavelength $\lambda_1$. In a fourth exemplary embodiment, the reflectivity of the rear facet 312 at wavelength $\lambda_1$ can be greater than 90 percent, while the reflectivity of the front facet 311 is in a range between about 60 percent and 95 percent at the wavelength $\lambda_1$.

Similar to the manner in which FIGS. 4A and 4B describe certain exemplary embodiment of the laser 111, FIGS. 4C and 4D describe certain exemplary embodiments of the laser 121. As shown in the exemplary plots 421 and 422, the front and rear facets 321, 322 of the laser 121 both exhibit high transmission (and low reflectivity) at the wavelength $\lambda_1$. Accordingly, the optical signal 113O output by the laser 111 at the wavelength $\lambda_1$ passes readily through the front and rear facets 321, 322 of the laser 121 for reception by the detector 130 (as discussed above).

Meanwhile, the relatively low transmission (and relatively high reflectivity) of the facets 321, 322 of the laser 121 at the wavelength $\lambda_2$ provide resonant amplification and lasing. Accordingly, the laser 121 emits laser light having an approximate wavelength of $\lambda_2$ to provide the optical signal 123O.

As discussed above with reference to FIGS. 4A and 4B, the front facet 321 typically has a higher transmission (and lower reflectivity) at the lasing wavelength $\lambda_2$ than the rear facet 321, so that a higher fraction of the optical signal 123O emits from the front facet 322 than from the rear facet 321.

The exemplary reflectivity values for the facets 312, 311 of the laser 111 discussed above can be translated to the laser 121. In other words, the facet reflectivity values at the lasing wavelength ($\lambda_1$) of the laser 111 can apply to facet reflectivity at the lasing wavelength ($\lambda_2$) of the laser 121.

FIG. 4 illustrates exemplary spectral characteristics of the laser 111 and the laser 121 that facilitate lasing at one wavelength while supporting optical transmission at another wavelength. As discussed above, exemplary transmission and reflection can be provided by a thin-film system manipulating light via thin-film interference. Alternatively, wavelength-selective transmission and reflection can be provided by: grating structures imposed on (or disposed adjacent) a laser's gain medium, for example as a DFB laser; or grating structures disposed outside the laser's gain medium but along the path of light emitted by the laser, for example as a DBR laser or as an extended/external cavity laser.

Further, in various exemplary embodiments, the lasers 111, 121 can be DFB lasers, DBR lasers, fiber-Bragg grating lasers, silicon lasers, Fabry-Perot lasers, vertical-cavity surface-emitting lasers ("VCSELs"), fiber lasers, Raman lasers, semiconductor lasers, mono-mode lasers, single-mode lasers, mode-locked lasers, external cavity lasers, extended cavity lasers, multiple quantum well ("MQW") lasers, lasers that comprise a capped mesa buried hetero-structure ("CBMH") grown on an n-type substrate with MQW active layers and a DFB grating layer, diode lasers, quantum dot lasers, quantum dash lasers, silicon lasers, "silicon-photonic" lasers, optical pumped lasers that can comprise silicon, compound semiconductor lasers, strained quantum well lasers, edge emitting lasers, frequency doubling lasers, separate confinement hetrostructure quantum well lasers, buried hetrostructure diode lasers, quantum cascade lasers, multimode lasers, lasers that lase at multiple longitudinal modes, or lasers that lase at multiple transverse modes (not an exhaustive list).

Turning now to FIG. 5, this figure illustrates gain profile plots 505, 510 of two lasers 111, 121, respectively included in two terminals 101, 102, of an optical network 100 in accordance with certain exemplary embodiments of the present invention. In an exemplary embodiment, the plots 505, 510 describe characteristics of the lasers 111, 121 of the transceivers 110, 120 illustrated in FIGS. 1, 2A, 2B, 2C, 3, and 4 and described above.

As shown in the exemplary plot 505 of FIG. 5A, the laser 111 of the transceiver 110 has a gain profile with a peak near the wavelength $\lambda_1$, which is the approximate lasing wavelength of the laser 111. The laser gain represented in the illustrated gain profile generally describes the amount of light amplification of a laser in the absence of the reflectors that create the lasing cavity.

The gain of the laser 111 at the wavelength $\lambda_2$ (the lasing wavelength of the laser 121), is less than the gain of the laser 111 at the wavelength $\lambda_1$ (the lasing wavelength of the laser 111). Accordingly, the laser 111 has a higher propensity to lase at wavelength $\lambda_1$ than at wavelength $\lambda_2$. This differential in gain helps the laser 111 avoid responding to the incoming optical signal 123O, which has a wavelength of $\lambda_2$.

As shown in the exemplary plot 510 of FIG. 5B, the laser 121 has a different gain profile than the laser 111 illustrated in FIG. 5A. More specifically, the gain profile of the laser 121 peaks at the wavelength $\lambda_2$. The laser 121 has higher gain at the wavelength $\lambda_2$ than at the wavelength $\lambda_1$ and thus has a preferential tendency to lase at the wavelength $\lambda_2$. Accordingly, the laser 121 tends to avoid responding to the optical signal 113O (which has a wavelength of $\lambda_1$) as the optical signal 113O transmits through the lasing medium of the laser 121.

In an exemplary embodiment, the laser 111 and the laser 121 have gain media with different compositions, and those different compositions produce different gain characteristics, as discussed above. In one exemplary embodiment, the laser 111 comprises gallium aluminum arsenide for short wavelength operation while the laser 121 comprises indium gallium arsenide phosphide ("InGaAsP") for long wavelength operation. In one exemplary embodiment, both lasers 111, 121 comprise InGaAsP but the individual compositions and structures of the lasers 111, 121 provide distinct gain profiles, for example as illustrated in the plots 505, 510. In one exemplary embodiment, one or both of the lasers 111, 121 comprise indium phosphide (InP), which can be adapted for each of the lasers 111, 121 to provide tailored gain profiles. For example, the laser 111 can be a InP laser running at about 1310 nm, while the laser 121 can be an InP laser running at about 1550 nm.

Other exemplary lasing material systems can comprise selected combinations of the following materials: InGaAsP (1-1.8 microns), GaAsSb (1-1.6 microns), AlGaAs (0.7-0.9 microns), GaAsP (0.6-1 microns), AlGaInP (0.6-0.7 microns), InGaAs (0.6-3 microns), GaInN (0.35-0.7 microns), and/or CdZnS (0.3-0.5 microns). One of the lasers 111, 121, can comprise one of these materials, with the other laser 111, 121 comprising another of these materials. Further, the pair of lasers 111, 121 can comprise appropriate combinations of the material system discussed in this paragraph.

In one exemplary embodiment, at least one of the lasers 111, 121 comprises InAs/InP. In one exemplary embodiment, at least one of the lasers 111, 121 comprises InGaAsP/InP. In one exemplary embodiment, at least one of the lasers 111, 121 comprises InGaAsP/InP. In one exemplary embodiment, at least one of the lasers 111, 121 comprises a MQW laser diode. In one exemplary embodiment, at least one of the lasers 111, 121 comprises InGaAsP/InP. In one exemplary embodiment, at least one of the lasers 111, 121 comprises a MQW DFB laser. In one exemplary embodiment, at least one of the lasers 111, 121 comprises InGaAsP/InP. In one exemplary embodiment, at least one of the lasers 111, 121 comprises a MQW DBR laser. In one exemplary embodiment, at least one of the lasers 111, 121 comprises GaAs. In one exemplary embodiment, at least one of the lasers 111, 121 comprises GaAs/AlGaAs. In one exemplary embodiment, at least one of the lasers 111, 121 comprises AlInGaAs. In one exemplary embodiment, at least one of the lasers 111, 121 comprises InGaAsP. In one exemplary embodiment, at least one of the lasers 111, 121 comprises InGaAs material and quantum dots. In one exemplary embodiment, at least one of the lasers 111, 121 comprises GaInN(Sb)As. In one exemplary embodiment, at least one of the lasers 111, 121 comprises AlGaAsSb. In one exemplary embodiment, at least one of the lasers 111, 121 comprises InP base material with InGaAsP layers manufactured by molecular beam epitaxy ("MBE") or metal organic chemical vapor deposition ("MOCVD"). In one exemplary embodiment, at least one of the lasers 111, 121 is a VCSEL comprising AlGaAs and operating in a 850 nm region of the light spectrum. In one exemplary embodiment, at least one of the lasers 111, 121 comprises a distributed feedback laser comprising InP and operating in a 1550 nm region of the light spectrum, for example in the region in which fiber optic light attenuation associated with water absorption dips to a local minimum. In one exemplary embodiment, at least one of the lasers 111, 121 comprises a distributed feedback laser comprising InP and operating in a 1310 nm region of the light spectrum, for example in the region in which fiber optic light attenuation associated with water absorption dips to a local minimum. In one exemplary embodiment, at least one of the lasers 111, 121 comprises a strained quantum well laser comprising InGaAs operating in a 905 nm region of the light spectrum. In certain exemplary embodiments, one of the lasers 111, 121 comprises one of the laser technologies or materials described in this paragraph while the other one of the lasers 111, 121 comprises another of the laser technologies or materials described in this paragraph. Further, the pair of lasers 111, 121 can comprise appropriate combinations of the material systems or technologies discussed in this paragraph.

In one exemplary embodiment, at least one of the lasers 111, 121 comprises an optically pumped silicon laser, for example operating based on Raman scattering. Further, each of the lasers 111, 121 can comprise a silicon-based gain material, optically pumped or energized via electricity. Accordingly, the lasers 111, 121 can comprise silicon photonic implementations.

In one exemplary embodiment, each of the lasers 111, 121 comprises a material platform for operating respectively at 1300 and 1550 nm. Such material platform may comprise InP—InGaAsP or GaAs—InGaAsN, for example.

Turning now to FIG. 6, this figure illustrates an alternative exemplary embodiment to that illustrated in FIG. 5, discussed above. FIG. 6 illustrates gain profile plots 605, 610 of two lasers 111, 121, respectively included in two terminals 101, 102, of an optical network 100 in accordance with certain exemplary embodiments of the present invention.

Whereas in the exemplary embodiment of FIG. 5 provides different gain profiles for each of the lasers 111, 121, the exemplary embodiment of FIG. 6 provides similar (or common or substantially equal) gain profiles for both of the lasers 111, 121. Further, for the exemplary embodiment of FIG. 6, the gain of the laser 111 at the wavelength $\lambda_1$ is approximately equal to the gain of the laser 111 at the wavelength $\lambda_2$. And, the gain of the laser 121 at the wavelength $\lambda_1$ is approximately equal to the gain of the laser 121 at the wavelength $\lambda_2$.

In the exemplary embodiment of FIG. 6, the filtering or wavelength-selectivity of the facets 312, 311, 321, 322 (or a filter, grating, absorber, etc.) can control the lasers 111, 121 to operate at the respective wavelengths $\lambda_1$, $\lambda_2$, while each is essentially immune (or resistant) to interference or disruption from light of the other wavelength $\lambda_1$, $\lambda_2$. In an exemplary embodiment, such control, immunity, or resistance to operational disruption can be due at least in part to loss or attenuation in a specific wavelength region or a color band.

In one exemplary embodiment, a grating laterally or longitudinally adjacent the lasers' gain media (for example in either a DFB or a DBR configuration), stabilizes the lasers' operation to provide the desired spectral performance.

In certain exemplary embodiments, the lasers 111, 121 can have coherency lengths that help them avoid interfering with operations of one another. The distance between the lasers 111, 121 can be substantially longer than the respective coherency lengths, for example.

Turning now to FIGS. 7A and 7B, these figures illustrate an enclosure 710 for a laser 121 and a detector 130 of a terminal 102 of an optical network 100 in accordance with certain exemplary embodiments of the present invention. More specifically, FIGS. 7A and 7B illustrate overhead and perspective views of a laser 121 and detector 130 packaged in the enclosure 710 to provide a module 700 as an exemplary embodiment of a component of a transceiver 120 as illustrated in FIGS. 1-6 and discussed above. While the module 700 is illustrated in FIGS. 7A and 7B in the context the transceiver 120, features of the module 700 are applicable to the transceiver 110 or the transceiver 120. As discussed above, the transceiver 110 and the transceiver 120 can have a common architecture and incorporate may common components.

In one exemplary embodiment of the illustrated module 700, the signal separation system 180 is outside the enclosure 710, with the module 700 and the signal separation system 180 disposed in a larger enclosure (not illustrated in FIGS. 7A and 7B) or on a common circuit board or "blade." Alternatively, the signal separation system 180 can be contained in the module 700 (for example as an IC chip or as a multichip module ("MCM") mounted on a ceramic substrate inside the enclosure 710). Accordingly, the module 700 can be either an exemplary embodiment of the transceiver 120 or an exemplary embodiment of an element in the transceiver 120.

In various exemplary embodiments, the module 700 can have a geometric form of a butterfly-type package, a dual inline pin ("DIP") package, a "XENPAK" package, an "XPAK" package, an "X2" package, a "small form-factor pluggable" ("SFP") package, an "XFP" package, a TO-can (see FIG. 7C discussed below), a TO-56 header package, an industry-standard package, a MCM package, a package conforming to a multi-source agreement ("MSA"), etc.

In the illustrated exemplary embodiment, the enclosure 710 houses the laser 121 and the detector 130. The enclosure 710 comprises an enclosure wall 120 extending around the perimeter of the module 700, a floor 722 forming a base or bottom of the module 700, and a cover 725 forming a top or a lid of the module 700. The enclosure wall 720, the floor 722, and the cover 725 provide environmental protection (for example against dust, debris, moisture, etc.) as well as electromagnetic shielding. Thus, the enclosure wall 720, the floor 722, and the cover 725 each comprises conductive material that repels transmission of electromagnetic signals, for example in the radio frequency ("RF") range. Accordingly, the enclosure 710 inhibits unwanted signals (airborne or otherwise) from interacting with the laser 121, the detector 130, and/or associated circuitry (such as the signal separation system 180) in a manner that might interfere with operations.

The enclosure wall 120, the floor 722, and the cover 725 can be joined together with via laser welding, bonding, arc welding, solder, braze, silver-loaded epoxy, etc. In various exemplary embodiments, the resulting joints can be hermetic seals, non-hermetic seals, moisture resistant, moisture proof, impervious to gaseous permeation, permeable, gas permeable, compliant with an industry standard, etc.

The optical fiber 175 enters the enclosure 710 through an opening or an aperture that can be sealed via braze, solder, glue, or some other appropriate attachment or fastening system. In an exemplary embodiment, the optical fiber 175 comprises a fiber optic pigtail leading to a longer transmission optical fiber (e.g. in turn leading to the WAN 191). In other words, the optical fiber 175 illustrated in FIG. 1 can comprise multiple fiber optic segments, including a pigtail and a transmission optical fiber, for example.

An optical waveguide 705 guides light between the laser 121 and the detector 130. The optical waveguide 705 can comprise a fiber optic stub, a section of waveguide in a PLC, or some other appropriate means for channeling light between the laser 121 and the detector 130.

The optical waveguide 705 passes though a shield 715 within the enclosure 710, for example through an aperture in the shield 715. The shield 715 helps manage energy flow between the laser 121 and the detector 130 (including supporting circuitry of the laser 121 and the detector 130, as discussed above). In an exemplary embodiment, the shield 715 comprises a plate, a sheet, or a film of conductive material (such as metal) that blocks or inhibits transmission of electromagnetic radiation. The electromagnetic radiation may have a longer wavelength than the light emitted by the laser 121, for example outside the range ordinarily considered light and into the RF or microwave region. Accordingly, the shield 715 can suppress or block RF energy emitted by the circuitry (discussed above) that drives the laser 121 so that such energy is not received by the circuitry (discussed above) associated with the detector 130. The module's shielding helps isolate the laser-drive circuitry from the circuitry of the signal separation system 180 and the receiver module 230.

The shield 715 and the waveguide 705 manage energy transmission between the laser 121 and the detector 130 so that luminous energy or light transmits through the waveguide 705, while the shield 715 blocks the RF energy. The waveguide 705 passes through the shield 715 and can be bonded thereto, for example via soldering, braze, glue, epoxy, etc. Accordingly, the shield 715 typically comprises a hole, aperture or passage, and the waveguide 705 is disposed in the hole, with sections of the waveguide 705 on each side of the shield 715.

In certain exemplary embodiments, the module 700 comprises a thermal electric cooler (not illustrated in FIGS. 7A and 7B) or some other active cooling provision for maintaining the laser 121 at a target temperature or within a band of acceptable temperatures. In other exemplary embodiments, a thermal electric cooler may be excluded from the module 700.

Turning now to FIG. 7C, this figure illustrates a packaged laser 121 and detector 130 of a terminal 102 of an optical network 100 in accordance with certain exemplary embodiments of the present invention. More specifically, FIG. 7C illustrates an exemplary embodiment in which the laser 121 and the detector 130 are housed in a TO-can-style package 750. While such packaging can be relevant to both transceivers 110, 120, the TO-can-style package 750 is illustrated in the exemplary embodiment of the transceiver 120, so as to comprise the laser 121.

The member 755 functions as a heat sink that receives and dissipates heat produced by the laser 121 in connection with emitting light. The detector 130 is mounted to the base 775 of the TO-can-style package 750. As discussed above with reference to FIGS. 1 through 6, the illustrated detector 130 receives the incoming optical signals 113O and the outgoing optical signals 123O (wherein the incoming and outgoing descriptors are relative to the transceiver 120). Accordingly, the detector 130 can function both as a rear facet monitor and as a receiver detector.

The housing 770 comprises a lensed aperture 765 that couples the outgoing optical signals 123O (emitted by the laser 121) into the optical fiber 175 and couples the incoming optical signals 113O (emitted by the optical fiber 175) into the laser 121. Accordingly, the lensed aperture 765 can comprise an optical element, such as a lens, handling bidirectional light.

In certain exemplary embodiment, the lensed aperture 765 can comprise one or more diffractive elements, holographic lenses, concave lenses, convex lenses, cylindrical lenses, Fresnel lens, PLC features, prisms, circulators, isolators, lens arrays, ball lenses, micro-optic components, nano-optic elements, planar micro-lenses, ion-exchanged components, interconnects, crystals, lenslets, or other suitable active or passive components for manipulating light.

The leads 760 transmit electrical signals into and out of the TO-can-style package 750. In various exemplary embodiments, the leads 760 can number three, four, five, six, seven, etc. The leads 760 can carry incoming and outgoing data 113, 123, electrical power, status information, and so forth.

In an exemplary embodiment, the TO-can-style package 750 comprises elements or features corresponding to (or including) those illustrated in FIGS. 7A and 7B. Further, the TO-can-style package 750 can comprise elements or features discussed above with reference to FIGS. 7A and 7B. More specifically, the embodiment illustrated in FIG. 7C can comprise the waveguide 705, the shield 705, and/or the signal separation system 180 disposed in a single enclosure.

Figure 9:
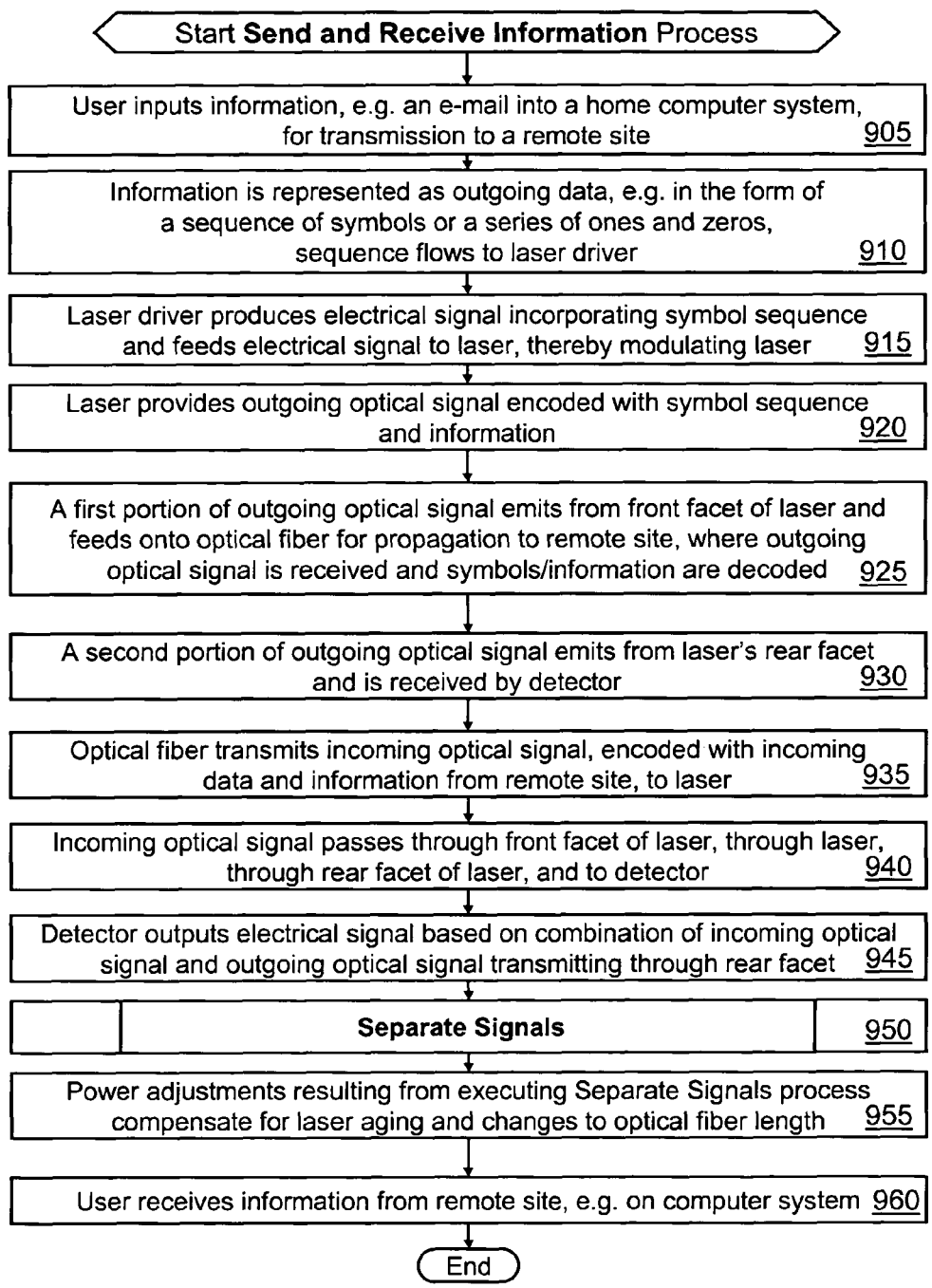
FIG. 9 is a flowchart of an exemplary process for sending and receiving information at a terminal of an optical network in accordance with certain exemplary embodiments of the present invention.
Figure 10:
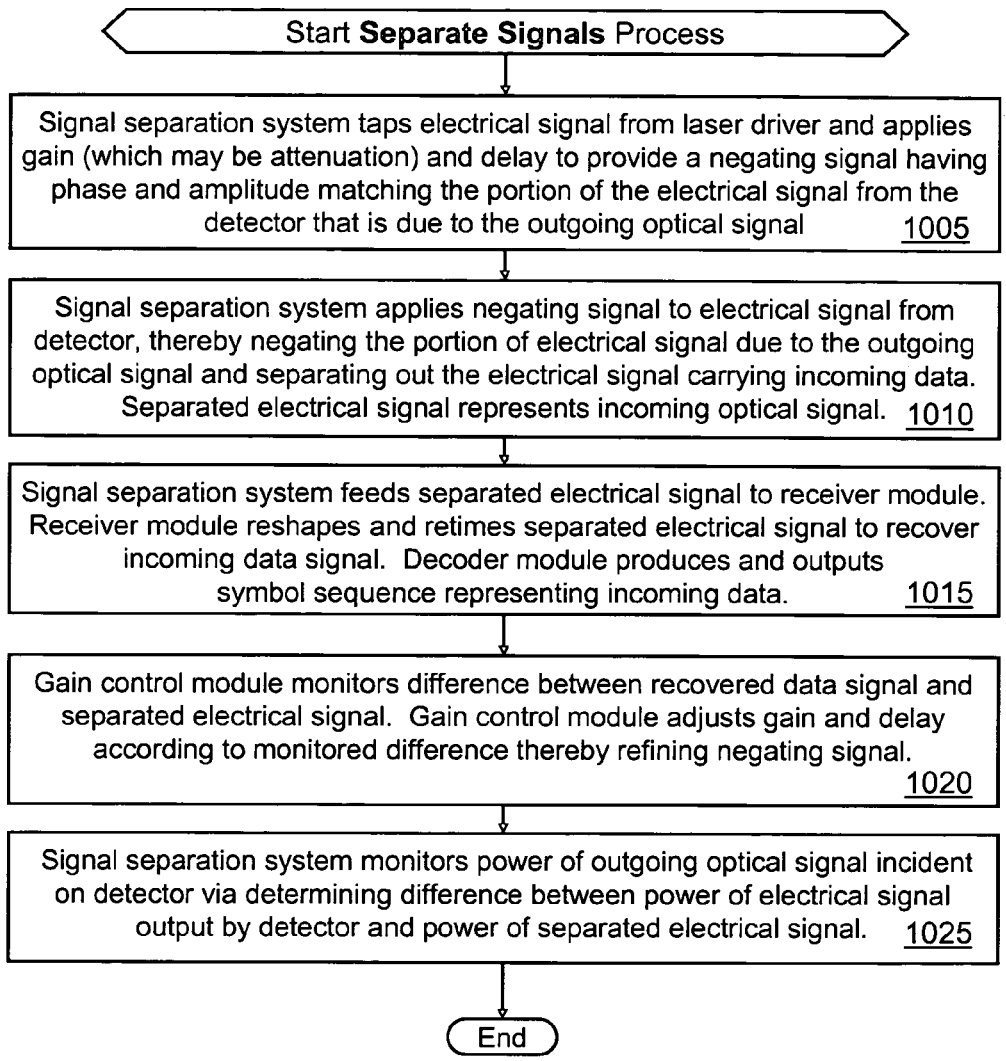
FIG. 10 is a flowchart of an exemplary process for separating incoming and outgoing signals in connection with sending and receiving information at a terminal of an optical network in accordance with certain exemplary embodiments of the present invention.

An exemplary process or method will now be discussed with reference to FIGS. 8, 9, and 10. FIG. 8 illustrates plots 805, 810, 815, 820, 825, 830, 835, 840, 845, 850, 855 of signals in a terminal 101 of an optical network 100 in accordance with certain exemplary embodiments of the present invention. FIG. 9 illustrates a flowchart for an exemplary process 900, entitled "Send and Receive Information," for sending and receiving information at a terminal 101 of an optical network 100 in accordance with certain exemplary embodiments of the present invention. FIG. 10 illustrates a flowchart of an exemplary process 900 for separating incoming and outgoing signals, entitled "Separate Signals," in connection with sending and receiving information at a terminal 101 of an optical network 100 in accordance with certain exemplary embodiments of the present invention.

Certain steps in the processes described below (or elsewhere herein) must naturally precede others for the present invention to function as described. However, the present invention is not limited to the order of the steps described if such order or sequence does not adversely alter the functionality of the present invention. That is, it is recognized that some steps may be performed before or after other steps or in parallel with other steps without departing from the scope and spirit of the present invention.

Referring now to FIG. 9, at step 905 a user associated with the terminal 101 makes an input into a computing device, such as a computer 192, with an expectation that the input information will be sent to a remote site, such as another computer 192 associated with another terminal 102. That remote site might be located across a complex network, at an opposite end of a single segment of optical waveguide, or on a common substrate of a multi-core microprocessor system, for example. The input might comprise an e-mail, a prompt, a message, or some other information or data, for example.

At step 910, the information is represented in symbol format, for example as a sequence of ones and zeroes. The plot 805 of FIG. 8A illustrates an exemplary embodiment of the information so formatted, specifically as the outgoing data 113.

At step 915, the laser driver 215 feeds the electrical signal 113E to the laser 111. The plot 810 of FIG. 8B illustrates an exemplary embodiment of the electrical signal 113E for driving and modulating the laser 111.

At step 920, the laser 111 receives the electrical signal 113E. That electrical signal 113E modulates the laser 111, varying the emissions of the laser 111. In response, the laser 111 produces the outgoing optical signal 113O.

At step 925, the outgoing optical signal 113O emits from the front facet 311 of the laser 111 and couples onto the optical fiber 175. The plot 815 of FIG. 8C illustrates an exemplary embodiment of the optical signal 113O as coupled to the optical fiber 175 for transmission to the remote site associated with the terminal 102.

As discussed above, at the remote site, the optical signal 113O propagates through the laser 121 and is received by the detector 130 associated therewith. Signal processing at the remote site provides the data 113 to the intended recipient (also as discussed above).

At step 930, the outgoing optical signal 113O emits from the rear facet 312 of the laser 111. The detector 130 adjacent that rear facet 312 receives the outgoing optical signal 113O. The plot 820 of FIG. 8D illustrates an exemplary embodiment of the optical signal 113O as incident on (and as received by) that detector 130.

In accordance with steps 925 and 930 and the exemplary plots 815, 820 of FIGS. 8C and 8D, the optical signal 113O passes through the rear facet 312 and through the front facet 311. That is, the rear facet 312 emits the optical signal 113O, and the front facet 311 emits the optical signal 113O. This same scenario can be alternatively and equivalently characterized as one portion of the optical signal 113O passing through the rear facet 312, and another portion of the optical signal 113O passing through the front facet 311.

At step 935, the optical fiber 175 transmits the incoming optical signal 123O, which is encoded with incoming data 123 (which the laser 121, at the opposite end of the optical fiber 175, has emitted). That incoming optical signal 123O transmits towards the laser 111. The plot 825 of FIG. 8E illustrates an exemplary embodiment of the optical signal 123O as transmitted over the optical fiber 175.

At step 940, the incoming optical signal 123O passes through the front facet 311 of the laser 111, through the laser 111, and through the rear facet 312 of the laser 111. After passing through the laser 111, the optical signal 123O is incident upon the adjacent detector 130 of the transceiver 110. The plot 830 of FIG. 8F illustrates an exemplary embodiment of the optical signal 123O as transmitted through the laser 111 and incident upon the detector 130 of the transceiver 110.

In accordance with steps 940 and 930, a combination of the incoming optical signal 123O and the outgoing optical signal 113O exits the rear facet 312 and is incident upon the detector 130 of the transceiver 110. The plot 835 of FIG. 8G illustrates an exemplary embodiment of such a combination.

At step 945, the detector 130 of the transceiver 110 outputs the electrical signal 113E+123E according to the detector's response to the optical signal 113O and the optical signal 123O that are incident thereon. The plot 840 of FIG. 8H illustrates an exemplary embodiment of the electrical signal 113E+123E as output by the detector 130 of the transceiver 110 in response to incidence of the optical signal 113O and the optical signal 123O.

At step 950, which FIG. 10 illustrates in further detail in flowchart form, the signal separation system 180 processes the electrical signal 113E+123E from the detector 130 to identify the signal contribution attributable to the optical signal 113O and the signal contribution attributable to the optical signal 123O. As described above and as will be discussed in further detail below with reference to FIG. 10, the signal separation system 180 thus determines the incoming data 123E and the power level or intensity of the output of the laser 111.

At step 955, the laser driver 215 adjusts the laser 111 according to the power level assessment conducted at step 950 (as provided by the signal separation system 180). In an exemplary embodiment, the adjustment compensates for laser aging, temperature, or some other influence impacting the laser's operation. In certain exemplary embodiments, the power level can be set according to the length or the attenuation of the optical fiber 175. For example, adjusting the power level can provide an appropriate intensity level of the optical signal 113O at the transceiver 120 despite fiber optic transmission losses or to compensate for transmission attenuation.

At step 960, the user associated with the transceiver 110 receives information encoded in the optical signal 123O as the data 123, which was sent from the transceiver 120 with an intent and/or an expectation of arrival to that user. The information could comprise an e-mail reply, a prompt, or some other message or transmission. In certain exemplary embodiments, information is transmitted and received as analog signals. In certain other exemplary embodiments, the information is transmitted and received as digital, binary, or discrete signals.

In one exemplary embodiment, process 900 ends following step 960. However, process 900 typically repeats or iterates as two users communicate with one another, receive third-party messages, download Internet website content, watch television via the Internet, conduct voice-over-Internet-protocol ("VoIP") telephone conversations, download videos or songs, etc. In other words, the steps of process 900 may repeat to accommodate computing, computing, entertainment, or some other appropriate application or usage supported by optical communications.

Turning now to FIG. 10, this figure illustrates an exemplary embodiment of step 950 of process 900 in flowchart format. Accordingly, process 950 of FIG. 10, which is entitled "Separate Signals," provides an exemplary embodiment of step 950 of FIG. 9.

At step 1005 of process 950, the signal separation system 180 samples the electrical signal 113E propagating from the laser driver 215 to the laser 111. As discussed above with reference to FIG. 2B (and elsewhere), the signal separation system 180 produces a negating signal 113EN via applying gain, delay, phase shift, attenuation, filtering, or some other form of signal processing to the obtained sample.

The plot 845 of FIG. 8I illustrates an exemplary embodiment of the negating signal 113EN, which approximates the output of the detector 130 stemming from the optical signal 113O, wherein that detector 130 is disposed behind the rear facet 312 of the laser 111. The plot 845 of FIG. 8I approximates features of the plot 840 of FIG. 8H that are associated with the optical signal 113O that has passed through the rear facet 312 of the laser 111. Thus, the exemplary plot 840 and the exemplary plot 845 illustrate how the two, respectively plotted signals can have common signal features that facilitate negating or compensating for the response of the detector 130 to the optical signal 113O.

At step 1010, the signal separation system 180, applies the negating signal 113EN (exemplarily illustrated by FIG. 8I) to the electrical signal 113E+123E output by the detector 130 of the transceiver 110. In an exemplary embodiment, the signal application occurs at the node 205, for example as discussed above with reference to FIG. 2B. The signal application eliminates, suppresses, subtracts, negates, removes, compensates for, or cancels aspects of the electrical signal 113E+123E associated with the optical signal 113O.

The plot 850 of FIG. 8J illustrates an exemplary embodiment of the result of applying the negating signal 113EN. That is, FIG. 8J illustrates an exemplary embodiment of the signal 123E flowing out of the node 205. As shown in FIG. 8J, the resulting signal 123E has common signal features to the incoming optical signal 123O illustrated in plot 825 of FIG. 8E. Thus, signal processing has suppressed imprints of the outgoing data 113 on the detector's output electrical signal 113E+123E while retaining imprints of the incoming data 123.

At step 1015, the receiver module 230 and the 2R module 225 in particular further process the electrical signal 123E output from the node 205. The processing may include improving timing, signal shape, jitter, rise time, fidelity, or some other signal attribute or parameter, for example. The decoder module 220 receives the output of the 2R module 225 and produces a sequence of symbols, one and zeros, or some other appropriate representation of information. As illustrated in the exemplary plot 855 of FIG. 8K, the output from the decoder module 220 can be a high-fidelity signal conveying the data 123.

At step 1020, the gain control module 235 detects differences between the data signal 123E output from the 2R module 225 (which can be viewed as having been recovered) and the electrical signal 123E output from node 205. The gain control module 235 effectively assesses the level of signal processing that the 2R module 225 implemented in order to fully recover the incoming data 123. That is, the load of the 2R module 225 provides an indication of the performance of the negating signal 113EN feeding into the node 205. When the 2R module 225 performs minimal signal processing in connection with recovering the incoming data signal 123, the negating signal 113EN is performing well. On the other hand, when the 2R module 225 implements a high level of signal processing to recover the incoming data signal 123, the negating signal 113EN may benefit from an adjustment. As discussed above with reference to FIG. 2B (and elsewhere), the gain control module 235 makes adjustments and/or refinements to the variable delay 245, the adjustable amplifier 250, and the controllable/tunable/adjustable filter (if present) to refine or improve the negating signal 113EN.

At step 1025, the signal separation system 180 monitors the power of the outgoing optical signal 113O. In an exemplary embodiment, such monitoring proceeds via determining power of the difference between the electrical signal 113E+123E) output by the detector 130 and the electrical signal 123E output by the node 205. Accordingly, the signal separation system 180 makes a power assessment (or an amplitude assessment) of the portion of the electrical signal 113E+123E that represents the outgoing optical signal 113O. As discussed above, the laser driver 215 utilizes the resulting power monitor signal 113E to manage operations of the laser 111, for example to maintain a target power level or to make some planned change to the output power of the laser 111.

Process 950 ends following Step 1025. As discussed above with reference to FIG. 9, process 900 typically proceeds with step 955 following execution of process 950 (as an exemplary embodiment of step 950).

Technology has been disclosed and described in detail so as to enable one of ordinary skill in the art to make and use the technology without undue experimentation. Multiple exemplary embodiments have been described in a manner to enable one of ordinary skill in the art to exchange elements or features of the described embodiments among one another. The present disclosure includes teaching how components of one described embodiment can be substituted for corresponding components in another described embodiment.

Technology for sending and receiving optically encoded information has been described. From the description, it will be appreciated that an embodiment of the present invention overcomes limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown herein will suggest themselves to those skilled in the art, and ways of constructing other embodiments of the present invention will appear to practitioners of the art. Therefore, the scope of the present invention is to be limited only by the accompanying claims.

What is claimed is:

1. A system for transmitting and receiving optical signals, the system comprising:
    a medium responsive to an outgoing data signal for providing and amplifying a signal having a first wavelength to provide an outgoing optical signal;
    a first reflector located at one end of the medium and operative to:
        partially reflect first light emitting from a medium back to the medium for amplification and partially pass the first light from the medium as the outgoing optical signal, the first light having the first wavelength,
        substantially pass second light to the medium, the second light being an incoming optical signal having a second wavelength, the second wavelength being different from the first wavelength, and
        a front reflector having a lower transmittivity at the first wavelength than a transmittivity at the second wavelength;
    a rear reflector located at another end of the medium and operative to:
        partially reflect the first light emitting from the medium back to the medium for amplification and partially pass the first light emitting from the medium, and
        substantially pass the second light from the medium, and
    the rear reflector having a lower transmittivity at the first wavelength than a transmittivity at the second wavelength;
    a detector located on a side of the rear reflector opposite the medium and operative to produce an electrical signal in response to receiving the first light and the second light passed by the rear reflector; and
    an electrical circuit, connected to the detector and responsive to the electrical signal and the outgoing data signal, to provide an incoming data signal.

2. The system of claim 1, wherein the medium comprises silicon, and wherein the detector and the medium are mounted on a common substrate.

3. The optical system of claim 1, wherein:
    the medium comprises a laser having a first facet and a second facet; and
    the reflector comprises:
        a first plurality of thin-film layers attached to the first facet of the laser; and
        a second plurality of thin-film layers attached to the second facet of the laser.

4. The optical system of claim 1, wherein amplifying the first light comprises pumping the medium with another light.

* * * * *